United States Patent
Park et al.

(10) Patent No.: US 11,710,814 B2
(45) Date of Patent: Jul. 25, 2023

(54) ELECTRODES, ELECTROCHEMICAL CELLS, AND METHODS OF FORMING ELECTRODES AND ELECTROCHEMICAL CELLS

(71) Applicant: ENEVATE CORPORATION, Irvine, CA (US)

(72) Inventors: Benjamin Yong Park, Mission Viejo, CA (US); Ian R. Browne, Orange, CA (US); Stephen W. Schank, Howell, MI (US); Steve Pierce, Pleasanton, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/671,736

(22) Filed: Feb. 15, 2022

(65) Prior Publication Data

US 2022/0173372 A1  Jun. 2, 2022

Related U.S. Application Data

(60) Continuation of application No. 17/522,093, filed on Nov. 9, 2021, which is a continuation of application
(Continued)

(51) Int. Cl.
| | |
|---|---|
| *H01M 4/02* | (2006.01) |
| *H01M 4/04* | (2006.01) |
| *H01M 4/134* | (2010.01) |
| *H01M 4/1395* | (2010.01) |
| *H01M 4/36* | (2006.01) |
| *H01M 4/62* | (2006.01) |

(Continued)

(52) U.S. Cl.
CPC ....... *H01M 4/0435* (2013.01); *H01M 4/0404* (2013.01); *H01M 4/0471* (2013.01); *H01M 4/134* (2013.01); *H01M 4/1395* (2013.01); *H01M 4/366* (2013.01); *H01M 4/621* (2013.01); *H01M 4/622* (2013.01); *H01M 4/625* (2013.01); *H01M 4/661* (2013.01); *H01M 4/667* (2013.01); *H01M 10/0525* (2013.01); *H01M 2004/021* (2013.01); *Y02E 60/10* (2013.01); *Y02P 70/50* (2015.11); *Y10T 156/10* (2015.01)

(58) Field of Classification Search
CPC ...................................................... H01M 4/02
See application file for complete search history.

(56) References Cited

U.S. PATENT DOCUMENTS

2006/0148191 A1    7/2006   Mitchell et al.

FOREIGN PATENT DOCUMENTS

CN    WO 2007-056895    *    5/2007

OTHER PUBLICATIONS

Korean Official Action for Appln No. 10-2021-7023536 dated Jun. 30, 2022.

* cited by examiner

*Primary Examiner* — Jacob B Marks
(74) *Attorney, Agent, or Firm* — McAndrews, Held & Malloy, Ltd.

(57) ABSTRACT

Electrodes and methods of forming electrodes are described herein. The electrode can be an electrode of an electrochemical cell or battery. The electrode includes a current collector and a film in electrical communication with the current collector. The film may include a carbon phase that holds the film together. The electrode further includes an electrode attachment substance that adheres the film to the current collector.

20 Claims, 34 Drawing Sheets

Related U.S. Application Data

No. 16/694,849, filed on Nov. 25, 2019, now Pat. No. 11,177,467, which is a continuation of application No. 15/788,564, filed on Oct. 19, 2017, now Pat. No. 10,516,155, which is a continuation of application No. 14/302,321, filed on Jun. 11, 2014, now Pat. No. 9,806,328, which is a division of application No. 13/796,922, filed on Mar. 12, 2013, now Pat. No. 9,583,757, which is a continuation-in-part of application No. 13/333,864, filed on Dec. 21, 2011, now Pat. No. 9,397,338.

(60) Provisional application No. 61/488,313, filed on May 20, 2011, provisional application No. 61/426,446, filed on Dec. 22, 2010.

(51) Int. Cl.
*H01M 4/66* (2006.01)
*H01M 10/0525* (2010.01)

ELECTRODES, ELECTROCHEMICAL CELLS, AND METHODS OF FORMING ELECTRODES AND ELECTROCHEMICAL CELLS

CROSS-REFERENCE TO RELATED APPLICATIONS

This application is a continuation of U.S. application Ser. No. 17/522,093, filed Nov. 9, 2021, which is a continuation of U.S. application Ser. No. 16/694,849, filed Nov. 25, 2019, which is a continuation of U.S. application Ser. No. 15/788,564, filed Oct. 19, 2017, which is a continuation of U.S. application Ser. No. 14/302,321, filed Jun. 11, 2014, which is a divisional of U.S. application Ser. No. 13/796,922, filed Mar. 12, 2013, which is a continuation-in-part of U.S. application Ser. No. 13/333,864, filed Dec. 21, 2011, which claims the benefit of U.S. Provisional Application Nos. 61/426,446, filed Dec. 22, 2010, and 61/488,313, filed May 20, 2011, the entirety of each of which is hereby incorporated by reference.

BACKGROUND

Field of the Invention

The present disclosure relates to electrochemical cells and electrodes used in electrochemical cells. In particular, the present disclosure relates to electrodes and electrochemical cells that include silicon and carbon composite materials for use in batteries.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, brakes, mechanical failures, etc. Typical electrodes include electro-chemically active material layers on electrically conductive metals (e.g., aluminum and copper). For example, carbon can be deposited onto a current collector along with an inactive binder material. Carbon is often used because it has excellent electrochemical properties and is also electrically conductive. Electrodes can be rolled or cut into pieces which are then layered into stacks. The stacks are of alternating electro-chemically active materials with the separator between them.

SUMMARY

In certain embodiments, an electrode is provided. The electrode can include a current collector and a film in electrical communication with the current collector. The film may include a carbon phase that holds the film together. The electrode may also include an electrode attachment substance that adheres the film to the current collector.

The film may be a monolithic self-supporting film. Furthermore, the film may include silicon particles distributed within the carbon phase. The carbon phase may include hard carbon. Furthermore, the film may include porosity and at least some of the electrode attachment substance may be within the porosity of the film. For example, the porosity can be about 5 to about 50 percent by volume of the film and/or about 1 to about 70 percent by volume of the film.

The electrical attachment substance may include a polymer such as polyamideimide, polyvinylidene fluoride, and polyacrylic acid. Furthermore, electrode attachment substance can be substantially electrically nonconductive. The electrode attachment substance may allow for expansion of the anode active material and current collector without significant failure of the electrode. For example, the electrode may be able to be bent to a radius of curvature of at least 7 mm without significant cracking.

In certain embodiments, a method of forming an electrode is provided. The method may include sandwiching an electrode attachment substance between a current collector and a solid film comprising electrochemically active material such that the electrode attachment substance adheres the solid film to the current collector and the solid film is in electrical communication with the current collector. In some embodiments, the solid film at least partially absorbs the electrode attachment substance into porosity of the film.

In certain embodiments, an electrochemical cell is provided. The electrochemical cell may include a porous separator sheet and a cell attachment substance sandwiched between the porous separator sheet and the electrode described above. The cell attachment substance can include polyvinylidene fluoride. The cell attachment substance may coat at least one of or both of the porous separator sheet and the electrode. For example, the cell attachment substance that coats the porous separator sheet can be a first cell attachment substance and the cell attachment substance that coats the electrode can be a second cell attachment substance that is chemically different than the first cell attachment substance.

In certain embodiments, a method of forming an electrochemical cell is provided. The method can include sandwiching a cell attachment substance between a porous separator sheet and the electrode described above. The method may further include coating at least one of or both of the porous separator sheet and the electrode with the cell attachment substance. Moreover, the method may include heating the cell attachment substance after sandwiching the cell attachment substance between the porous separator sheet and the electrode.

In certain embodiments, an electrode is provided. The electrode can include a current collector and a film in electrical communication with the current collector. The film may include a carbon phase that holds the film together. The electrode may also include an electrode attachment substance that adheres the film to the current collector. The film may include porosity and at least about 90 percent of the porosity may be substantially free of the electrode attachment substance.

The electrode attachment substance may be substantially electrically nonconductive. Furthermore, the electrode attachment substance may form a substantially uniform layer disposed substantially over an entire surface of the film. The electrode attachment substance may include a polymer not soluble in a nonaqueous electrolyte solution. In some embodiments, the nonaqueous electrolyte solution includes a carbonate solvent. The polymer can include polyamideimide, polyvinylidene fluoride, polyethylene, or polypropylene. The current collector can include copper.

In some embodiments, the electrode may further include a second electrode attachment substance sandwiched between the current collector and a second film in electrical communication with the current collector. The film may include an anode. The anode may include silicon. The film may include porosity. For example, the porosity can be about 5 to about 50 percent by volume of the film or about 1 to about 70 percent by volume of the film. The film may have surfaces that are substantially free of the electrode attachment substance.

In certain embodiments, a method of forming an electrode is provided. The method may include providing a current collector coated with a first electrode attachment substance on a first side of the current collector. The first electrode attachment substance may be in a substantially solid state. The method may also include disposing a first solid film comprising electrochemically active material on the first electrode attachment substance; and heating the first electrode attachment substance to adhere the first solid film to the current collector.

The method can further include providing a second electrode attachment substance on a second side of the current collector. The second electrode attachment substance may be in a substantially solid state. Furthermore, the method can include disposing a second solid film comprising electrochemically active material on the second electrode attachment substance; and heating the second electrode attachment substance to adhere the second solid film to the current collector. Heating the first electrode attachment substance and heating the second electrode attachment substance may occur simultaneously.

In some embodiments, providing a current collector may include coating the current collector with a polymer solution on the first side of the current collector; and drying the polymer solution to form the first electrode attachment substance. Providing a second electrode attachment substance may include coating the current collector with a polymer solution on the second side of the current collector; and drying the polymer solution to form the second electrode attachment substance.

In other embodiments, providing a current collector may include providing a polymer resin on the first side of the current collector; and extrusion coating the polymer resin to form the first electrode attachment substance. Providing a second electrode attachment substance may include providing a polymer resin on the second side of the current collector; and extrusion coating the polymer resin to form the second electrode attachment substance.

In some embodiments of the method, the first electrode attachment substance includes a polymer that is not soluble in a nonaqueous electrolyte solution. The nonaqueous electrolyte solution can include a carbonate solvent. The polymer can include polyamideimide, polyvinylidene fluoride, polyethylene, or polypropylene. In certain embodiments of the method, heating includes heat laminating, roll pressing, or flat pressing.

DETAILED DESCRIPTION

Figure 1:
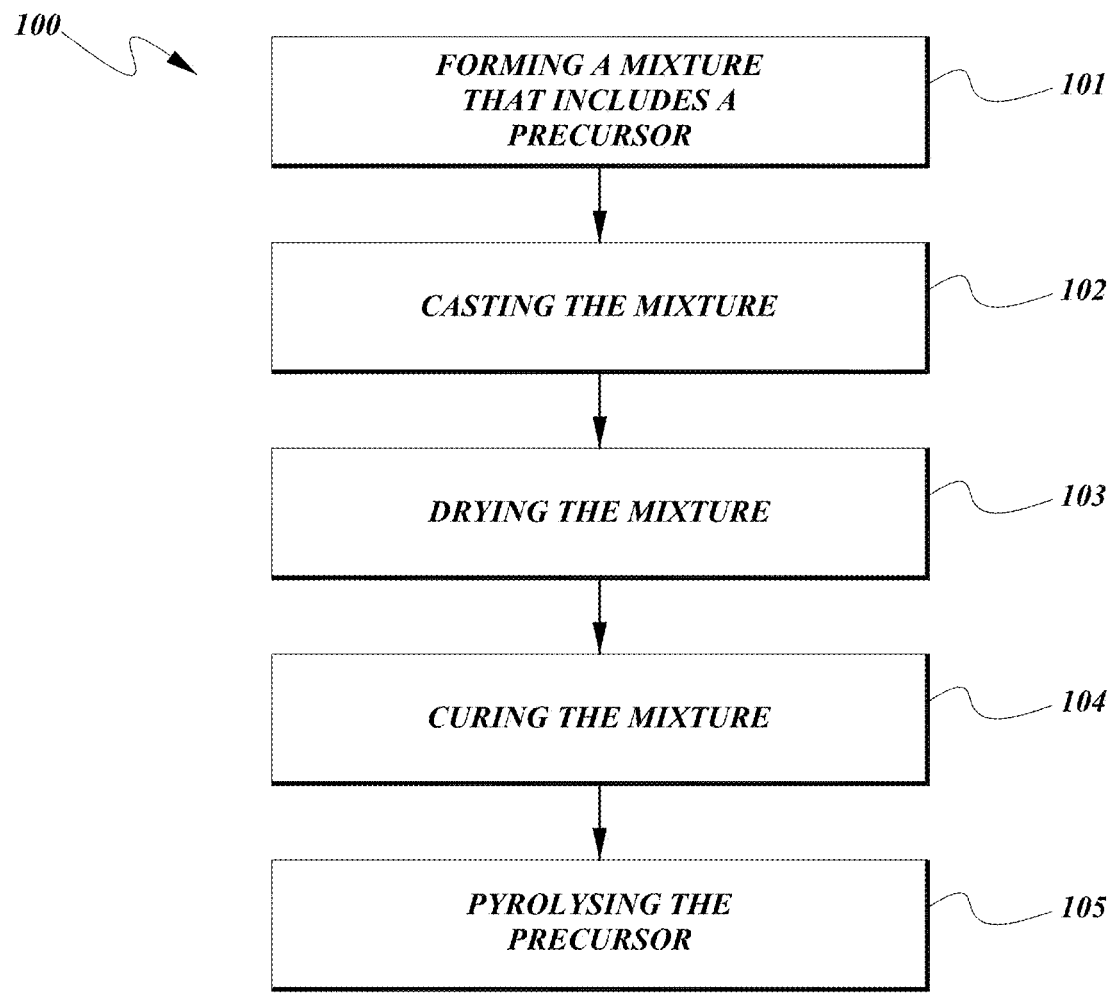
FIG. 1 illustrates an embodiment of a method of forming a composite material that includes forming a mixture that includes a precursor, casting the mixture, drying the mixture, curing the mixture, and pyrolyzing the precursor.

This application describes certain embodiments of electrodes (e.g., anodes and cathodes), electrochemical cells, and methods of forming electrodes and electrochemical cells that may include a carbonized polymer. For example, a mixture that includes a precursor including silicon can be formed into a silicon composite material. This mixture includes both carbon and silicon and thus can be referred to as a silicon composite material as well as a carbon composite material. Examples of mixtures and carbon composite materials and carbon-silicon composite materials that can be used in certain electrodes, cells, and methods described below are described in U.S. patent application Ser. No. 13/008,800, filed Jan. 18, 2011, and published on Jul. 21, 2011 as U.S. Patent Application Publication No. 2011/0177393, entitled "Composite Materials for Electrochemical Storage," the entirety of which is hereby incorporated by reference. In addition, certain embodiments of methods of forming an electrode and/or electrochemical cell using an attachment substance between a composite film and a current collector and/or between an electrode and a separator are also disclosed. Methods of reducing wrinkling of anodes are also provided.

I. Composite Materials

Typical carbon anode electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would be unable to mechanically support itself. Therefore, conventional electrodes require a support structure such as the collector to be able to function as an electrode. The electrode (e.g., anode or cathode) compositions described in this application can produce electrodes that are self-supported. The need for a metal foil current collector is eliminated or minimized because conductive carbonized polymer is used for current collection in the anode structure as well as for providing mechanical support. A current collector may be preferred in some applications where current above a certain threshold is required. Methods of attachment of the composite film (e.g., piece) to a current collector are described in section II below. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. Silicon, however, swells in excess of 300% upon lithiation. Because of this expansion, anodes including silicon may expand/contract and lose electrical contact to the rest of the anode. Therefore, a silicon anode should be designed to be able to expand while maintaining good electrical contact with the rest of the electrode.

This application also describes certain embodiments of a method of creating monolithic, self-supported anodes using a carbonized polymer. Because the polymer is converted into a electrically conductive and electrochemically active matrix, the resulting electrode is conductive enough that a metal foil or mesh current collector can be omitted or minimized. The converted polymer also may act as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 1200 mAh/g that can be due to, for example, 1) the use of silicon, 2) elimination or substantial reduction of metal current collectors, and 3) being comprised entirely (or almost entirely) of active material.

The composite materials described herein can be used as an anode in most conventional lithium ion batteries; they may also be used as the cathode in some electrochemical couples with additional additives. The composite materials can also be used in either secondary batteries (e.g., rechargeable) or primary batteries (e.g., non-rechargeable). In certain embodiments, the composite materials are self-supported structures. In further embodiments, the composite materials are self-supported monolithic structures. For example, a collector may not be included in the electrode comprised of the composite material. In certain embodiments, the composite material can be used to form carbon structures discussed in U.S. Patent Application Publication No. 2011/0020701 entitled "Carbon Electrode Structures for Batteries," the entirety of which is hereby incorporated by reference. Furthermore, the composite materials described herein can be, for example, silicon composite materials, carbon composite materials, and/or silicon-carbon composite materials.

FIG. 1 illustrates one embodiment of a method of forming a composite material 100. For example, the method of forming a composite material can include forming a mixture including a precursor, block 101. The method can further include pyrolyzing the precursor to convert the precursor to a carbon phase. The precursor mixture may include carbon additives such as graphite active material, chopped or milled carbon fiber, carbon nanofibers, carbon nanotubes, and/or other carbons. After the precursor is pyrolyzed, the resulting carbon material can be a self-supporting monolithic structure. In certain embodiments, one or more materials are added to the mixture to form a composite material. For example, silicon particles can be added to the mixture. The carbonized precursor results in an electrochemically active structure that holds the composite material together. For example, the carbonized precursor can be a substantially continuous phase. The silicon particles may be distributed throughout the composite material. Advantageously, the carbonized precursor will be a structural material as well as an electro-chemically active and electrically conductive material. In certain embodiments, material particles added to the mixture are homogenously distributed throughout the composite material to form a homogeneous composite.

The mixture can include a variety of different components. The mixture can include one or more precursors. In certain embodiments, the precursor is a hydrocarbon compound. For example, the precursor can include polyamic acid, polyimide, etc. Other precursors include phenolic resins, epoxy resins, and other polymers. The mixture can further include a solvent. For example, the solvent can be N-methyl-pyrollidone (NMP). Other possible solvents include acetone, diethyl ether, gamma butyrolactone, isopropanol, dimethyl carbonate, ethyl carbonate, dimethoxyethane, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrollidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain embodiments, the amount of precursor (e.g., solid polymer) in the solvent is about 10 wt. % to about 30 wt. %. Additional materials can also be included in the mixture. For example, as previously discussed, silicon particles or carbon particles including graphite active material, chopped or milled carbon fiber, carbon nanofibers, carbon nanotubes, and other conductive carbons can be added to the mixture. In addition, the mixture can be mixed to homogenize the mixture.

In certain embodiments, the mixture is cast on a substrate, block 102 in FIG. 1. In some embodiments, casting includes using a gap extrusion or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a polymer sheet, a polymer roll, or foils or rolls made of glass or metal. The mixture can then be dried to remove the solvent, block 103. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In certain embodiments, the dried mixture is a precursor film or sheet. In some embodiments, the dried mixture is cured, block 104. A hot press can be used to cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture. In certain embodiments, tape casting techniques can be used for the casting. In other embodiments, there is no substrate for casting and the anode film does not need to be removed from any substrate. The dried mixture may be cut or mechanically sectioned into smaller pieces.

The mixture further goes through pyrolysis to convert the precursor to carbon, block 105. In certain embodiments, the mixture is pyrolysed in a reducing atmosphere. For example, an inert atmosphere, a vacuum and/or flowing argon, nitrogen, or helium gas can be used. In some embodiments, the mixture is heated to about 900° C. to about 1350° C. For example, polyimide formed from polyamic acid can be carbonized at about 1175° C. for about one hour. In certain embodiments, the heat up rate and/or cool down rate of the mixture is about 10° C./min. A holder may be used to keep the mixture in a particular geometry. The holder can be graphite, metal, etc. In certain embodiments, the mixture is held flat. After the mixture is pyrolysed, tabs can be attached to the pyrolysed material to form electrical contacts. For example, nickel, copper or alloys thereof can be used for the tabs.

In certain embodiments, one or more of the methods described herein is a continuous process. For example, casting, drying, curing and pyrolysis can be performed in a continuous process; e.g., the mixture can be coated onto a glass or metal cylinder. The mixture can be dried while rotating on the cylinder creating a film. The film can be transferred as a roll or peeled and fed into another machine for further processing. Extrusion and other film manufacturing techniques known in industry could also be utilized prior to the pyrolysis step.

Pyrolysis of the precursor results in a carbon material (e.g., at least one carbon phase). In certain embodiments, the carbon material is a hard carbon. In some embodiments, the precursor is any material that can be pyrolysed to form a hard carbon. When the mixture includes one or more additional materials or phases in addition to the carbonized precursor, a composite material can be created. In particular, the mixture can include silicon particles creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material. Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon losses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can ensure that electrical contact to the surface of the silicon is not lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

Embodiments of a largest dimension of the silicon particles includes less than about 40 μm, less than about 1 μm, between about 10 nm and 40 μm, between about 10 nm and 1 μm, less than about 500 nm, less than about 100 nm, and about 100 nm. All, substantially all, or at least some of the silicon particles may comprise the largest dimension described above. For example, an average or median largest dimension of the silicon particles include less than about 40 μm, less than about 1 μm, between about 10 nm and 40 μm, between about 10 nm and 1 μm, less than about 500 nm, less than about 100 nm, and about 100 nm. The amount of silicon in the composite material can be greater than zero percent by weight of the mixture and composite material. In certain embodiments, the amount of silicon in the mixture is between greater than 0% and less than about 90% by weight or between about 30% and about 80% by weight of the mixture. Embodiments of the amount of silicon in the composite material include greater than 0% and less than about 35% by weight, greater than 0% and less than about 25% by weight, between about 10 and about 35% by weight, and about 20% by weight. In further certain embodiments, the amount of silicon in the mixture is at least about 30% by weight. Additional embodiments of the amount of silicon in the composite material include more than about 50% by weight, between about 30% and about 80% by weight, between about 50% and about 70% by weight, and between about 60% and about 80% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

The amount of carbon obtained from the precursor can be about 50 weight percent from polyamic acid. In certain embodiments, the amount of carbon from the precursor in the composite material is about 10 to 25% by weight. The carbon from the precursor can be hard carbon. Hard carbon is a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors include phenolic resins, epoxy resins, and other polymers that have a very high melting point or are cross-linked. Embodiments of the amount of hard carbon in the composite material includes about 10% to about 25% by weight, about 20% by weight, and more than about 50% by weight. In certain embodiments, the hard carbon phase is substantially amorphous. In other embodiments, the hard carbon phase is substantially crystalline. In further embodiments, the hard carbon phase includes amorphous and crystalline carbon. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon.

In certain embodiments, graphite particles are added to the mixture. Advantageously, graphite is an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, the largest dimension of the graphite particles is between about 0.5 microns and about 20 microns. All, substantially all, or at least some of the graphite particles may comprise the largest dimension described herein. In further embodiments, the average or median largest dimension of the graphite particles is between about 0.5 microns and about 20 microns. In certain embodiments, the mixture includes greater than 0% and less than about 80% by weight graphite particles. In further embodiments, the composite material includes about 40% to about 75% by weight graphite particles.

In certain embodiments, conductive particles which may also be electrochemically active are added to the mixture. Such particles provide both a more electronically conductive composite as well as a more mechanically deformable composite capable of absorbing the large volumetric change incurred during lithiation and de-lithiation. In certain embodiments, the largest dimension of the conductive particles is between about 10 nanometers and about 7 millimeters. All, substantially all, or at least some of the conductive particles may comprise the largest dimension described herein. In further embodiments, the average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, etc. Many carbons that are considered as conductive additives that are not electrochemically active become active once pyrolyzed in a polymer matrix. Alternatively, the conductive particles can be metals or alloys including copper, nickel, or stainless steel.

In certain embodiments, an electrode can include a composite material described herein. For example, a composite material can form a self-supported monolithic electrode. The pyrolyzed carbon phase (e.g., hard carbon phase) of the composite material can hold together and structurally support the particles that were added to the mixture. In certain embodiments, the self-supported monolithic electrode does not include a separate collector layer and/or other supportive structures. In some embodiments, the composite material and/or electrode does not include a polymer beyond trace amounts that remain after pyrolysis of the precursor. In further embodiments, the composite material and/or electrode does not include a non-electrically conductive binder.

In some embodiments, the composite material may also include porosity. For example, the porosity can be about 5% to about 40% by volume porosity. In some embodiments, the composite material (or the film) can include porosity of about 1% to about 70% or about 5% to about 50% by volume porosity.

In certain embodiments, an electrode in a battery or electrochemical cell can include a composite material described herein. For example, the composite material can be used for the anode and/or cathode. In certain embodiments, the battery is a lithium ion battery. In further embodiments, the battery is a secondary battery, or in other embodiments, the battery is a primary battery.

Furthermore, the full capacity of the composite material may not be utilized during use of battery to improve life of the battery (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to an gravimetric capacity of about 550 to about 850 mAh/g. Although, the maximum gravimetric capacity of the composite material may not be utilized, using the composite material at a lower capacity can still achieve a higher capacity than certain lithium ion batteries. In certain embodiments, the composite material is used or only used at an gravimetric capacity below about 70% of the composite material's maximum gravimetric capacity. For example, the composite material is not used at an gravimetric capacity above about 70% of the composite material's maximum gravimetric capacity. In further embodiments, the composite material is used or only used at an gravimetric capacity below about 50% of the composite material's maximum gravimetric capacity or below about 30% of the composite material's maximum gravimetric capacity.

EXAMPLES

The below example processes for anode fabrication generally include mixing components together, casting those components onto a removable substrate, drying, curing, removing the substrate, then pyrolyzing the resulting samples. N-Methyl-2-pyrrolidone (NMP) was typically used as a solvent to modify the viscosity of any mixture and render it castable using a doctor blade approach.

Example 1

In Example 1, a polyimide liquid precursor (PI 2611 from HD Microsystems corp.), graphite particles (SLP30 from Timcal corp.), conductive carbon particles (Super P from Timcal corp.), and silicon particles (from Alfa Aesar corp.) were mixed together for 5 minutes using a Spex 8000D machine in the weight ratio of 200:55:5:20. The mixture was then cast onto aluminum foil and allowed to dry in a 90° C. oven, to drive away solvents, e.g., NMP. This is followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of 15.8% of PI 2611 derived carbon, 57.9% of graphite particles, 5.3% of carbon resulting from Super P, and 21.1% of silicon by weight.

Figure 2:
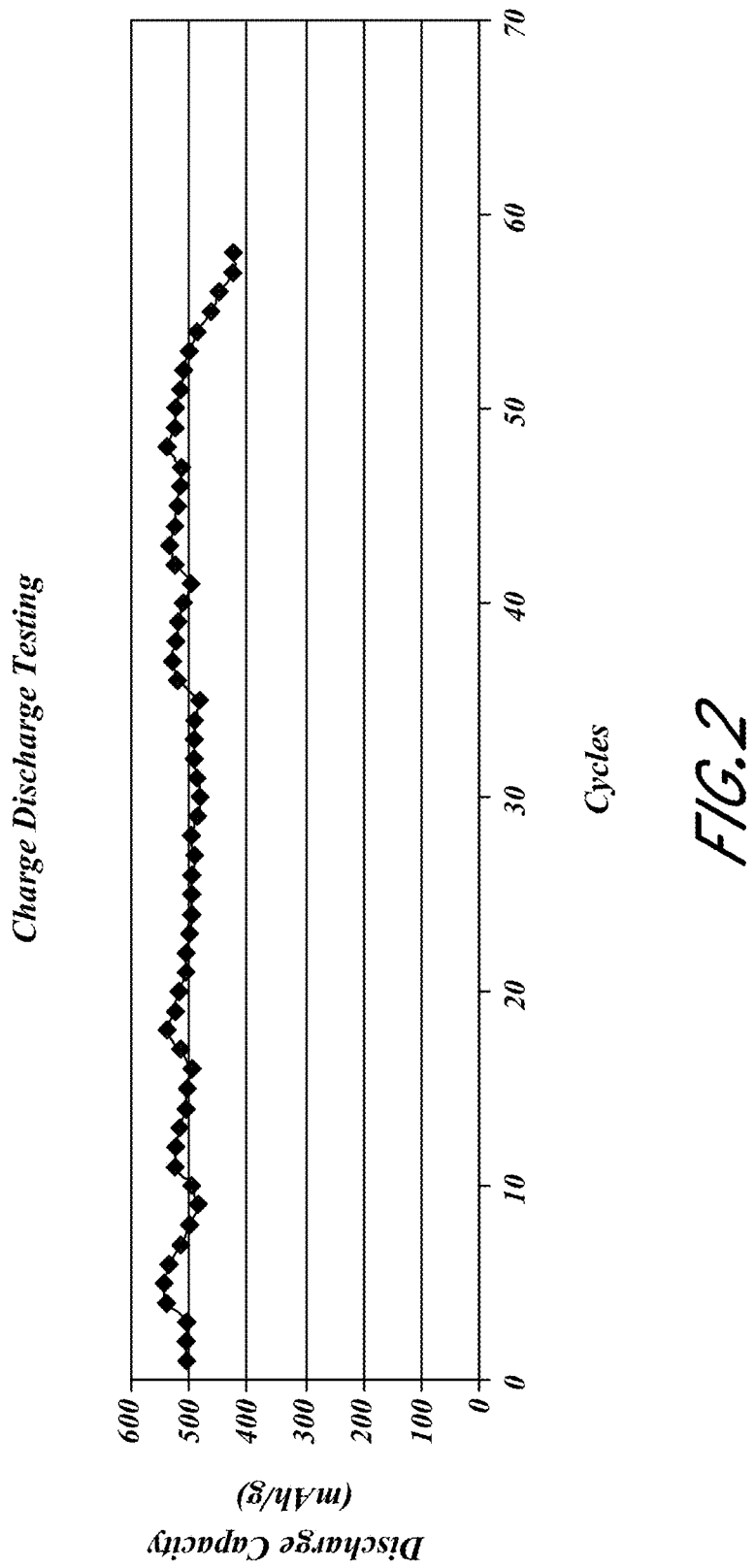
FIG. 2 is a plot of the discharge capacity at an average rate of C/2.6.

The resulting electrodes were then tested in a pouch cell configuration against a lithium NMC oxide cathode. A typical cycling graph is shown in FIG. 2.

Example 2

In Example 2, silicon particles (from EVNANO Advanced Chemical Materials Co., Ltd.) were initially mixed with NMP using a Turbula mixer for a duration of one hour at a 1:9 weight ratio. Polyimide liquid precursor (PI 2611 from HD Microsystems corp.), graphite particles (SLP30 from Timcal corp.), and carbon nanofibers (CNF from Pyrograf corp.) were then added to the Si:NMP mixture in the weight ratio of 200:55:5:200 and vortexed for around 2 minutes. The mixture was then cast onto aluminum foil that was covered by a 21 µm thick copper mesh. The samples were then allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed for around an hour at 1000° C. under argon. The process resulted in a composition of 15.8% of PI 2611 derived carbon, 57.9% of graphite particles, 5.3% of CNF, and 21.1% of silicon by weight.

Figure 3:
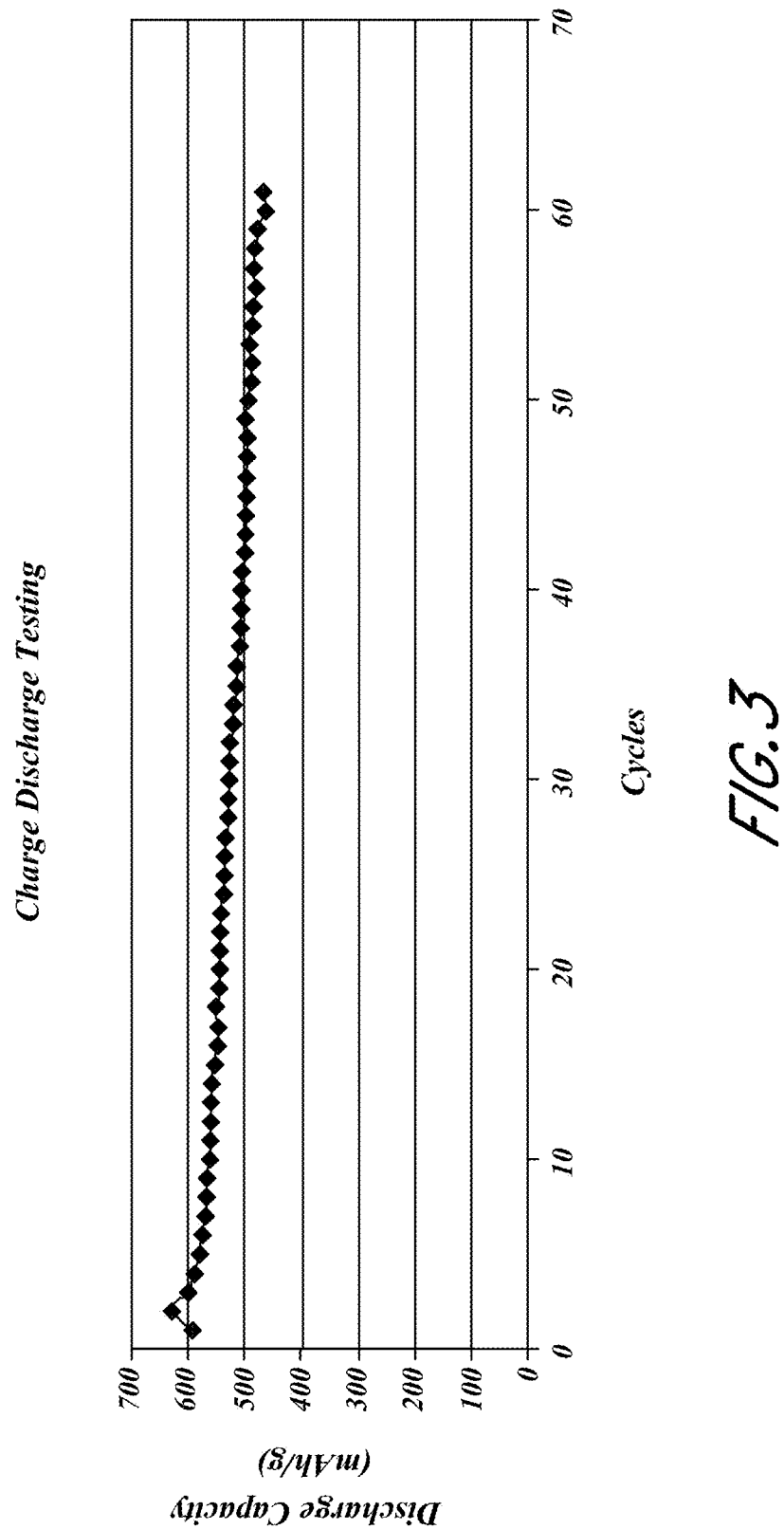
FIG. 3 is a plot of the discharge capacity at an average rate of C/3.

The resulting electrodes were then tested in a pouch cell configuration against a lithium NMC oxide cathode. A typical cycling graph is shown in FIG. 3.

Example 3

In Example 3, polyimide liquid precursor (PI 2611 from HD Microsystems corp.), and 325 mesh silicon particles (from Alfa Aesar corp.) were mixed together using a Turbula mixer for a duration of 1 hour in the weight ratios of 40:1. The mixture was then cast onto aluminum foil and allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of 75% of PI 2611 derived carbon and 25% of silicon by weight.

Figure 4:
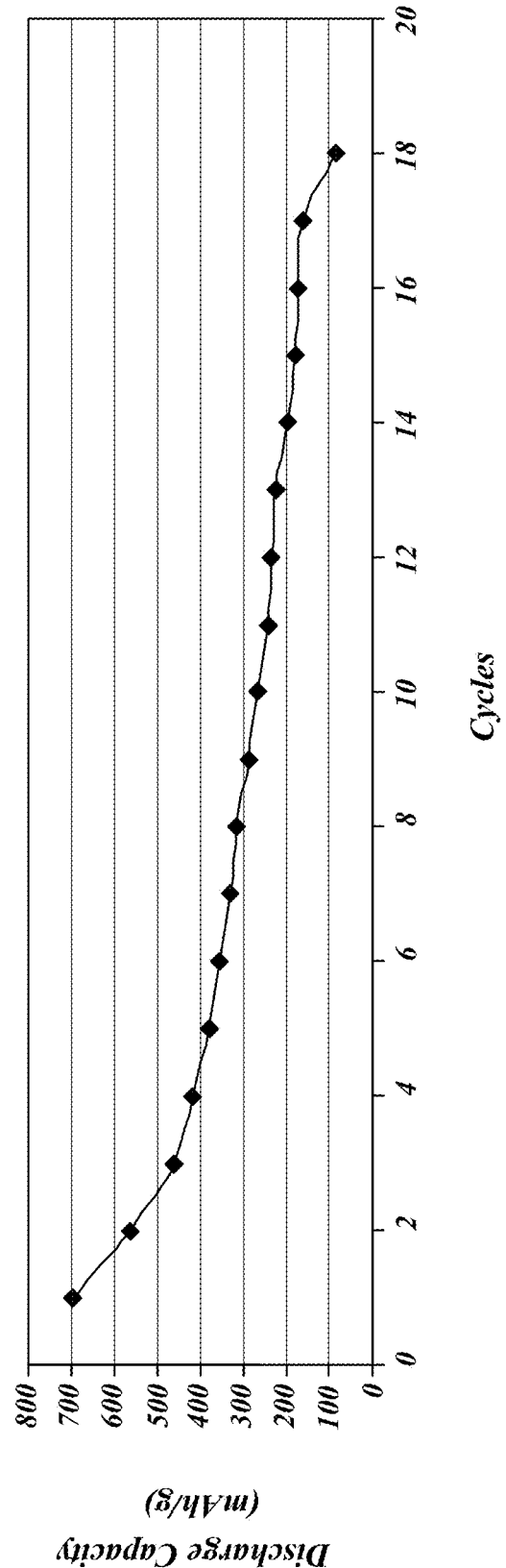
FIG. 4 is a plot of the discharge capacity at an average rate of C/3.3.

The resulting electrodes were then tested in a pouch cell configuration against a lithium NMC Oxide cathode. A typical cycling graph is shown in FIG. 4.

Example 4

In Example 4, silicon microparticles (from Alfa Aesar corp.), polyimide liquid precursor (PI 2611 from HD Microsystems corp.), graphite particles (SLP30 from Timcal corp.), milled carbon fibers (from Fibre Glast Developments corp.), carbon nanofibers (CNF from Pyrograf corp.), carbon nanotubes (from CNANO Technology Limited), conductive carbon particles (Super P from Timcal corp.), conductive graphite particles (K56 from Timca corp.) were mixed in the weight ratio of 20:200:30:8:4:2:1:15 using a vortexer for 5 minutes. The mixture was then cast onto aluminum foil. The samples were then allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed for around an hour at 1175° C. under argon. The process resulted in a composition similar to the original mixture but with a PI 2611 derived carbon portion that was 7.5% the original weight of the polyimide precursor.

Figure 5:
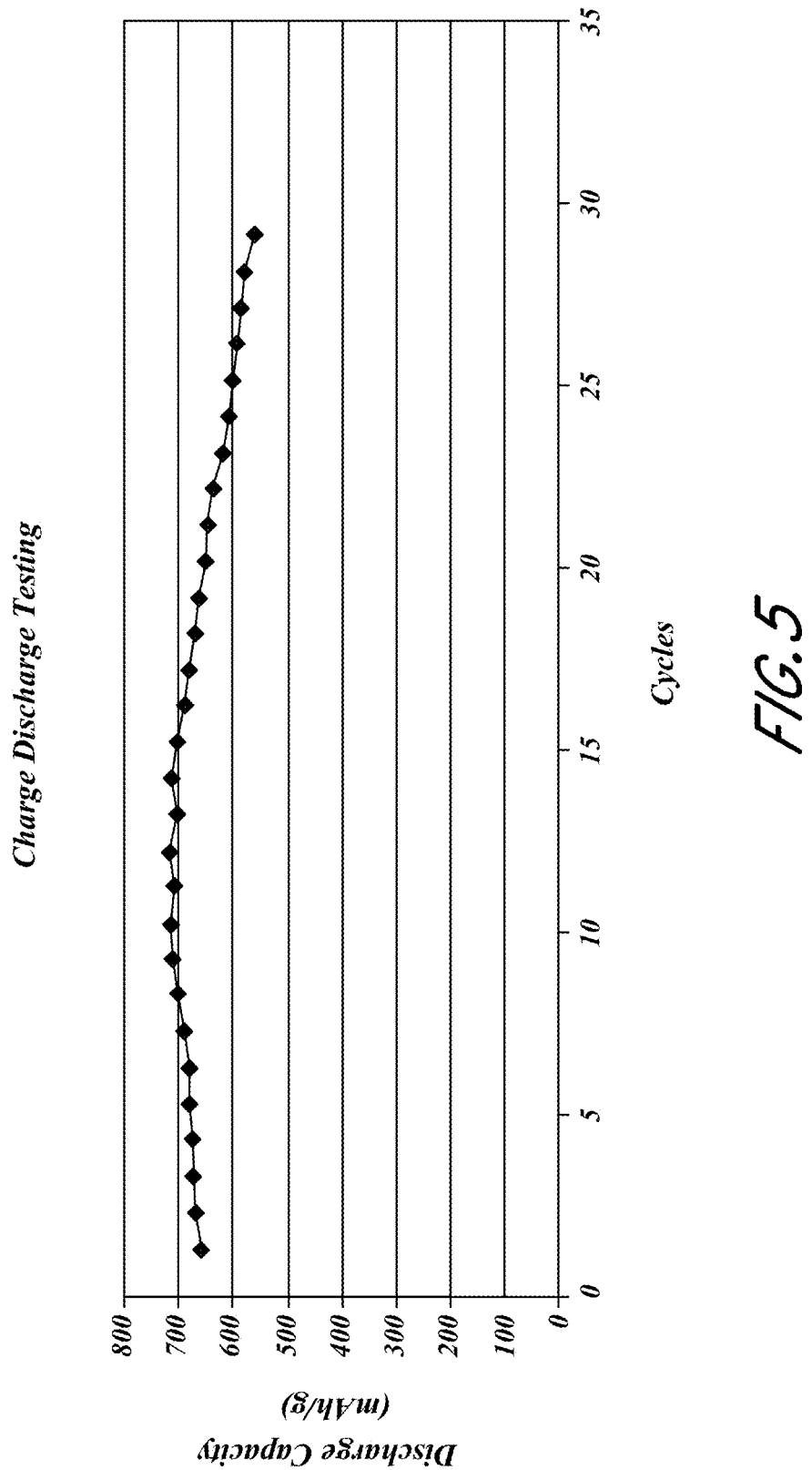
FIG. 5 is a plot of the discharge capacity at an average rate of C/5.

The resulting electrodes were then tested in a pouch cell configuration against a lithium NMC oxide cathode. A typical cycling graph is shown in FIG. 5.

Example 5

In Example 5, polyimide liquid precursor (PI 2611 from HD Microsystems corp.), and silicon microparticles (from Alfa Aesar corp.) were mixed together using a Turbula mixer for a duration of 1 hours in the weight ratio of 4:1. The mixture was then cast onto aluminum foil covered with a carbon veil (from Fibre Glast Developments Corporation) and allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of approximately 23% of PI 2611 derived carbon, 76% of silicon by weight, and the weight of the veil being negligible.

Figure 6:
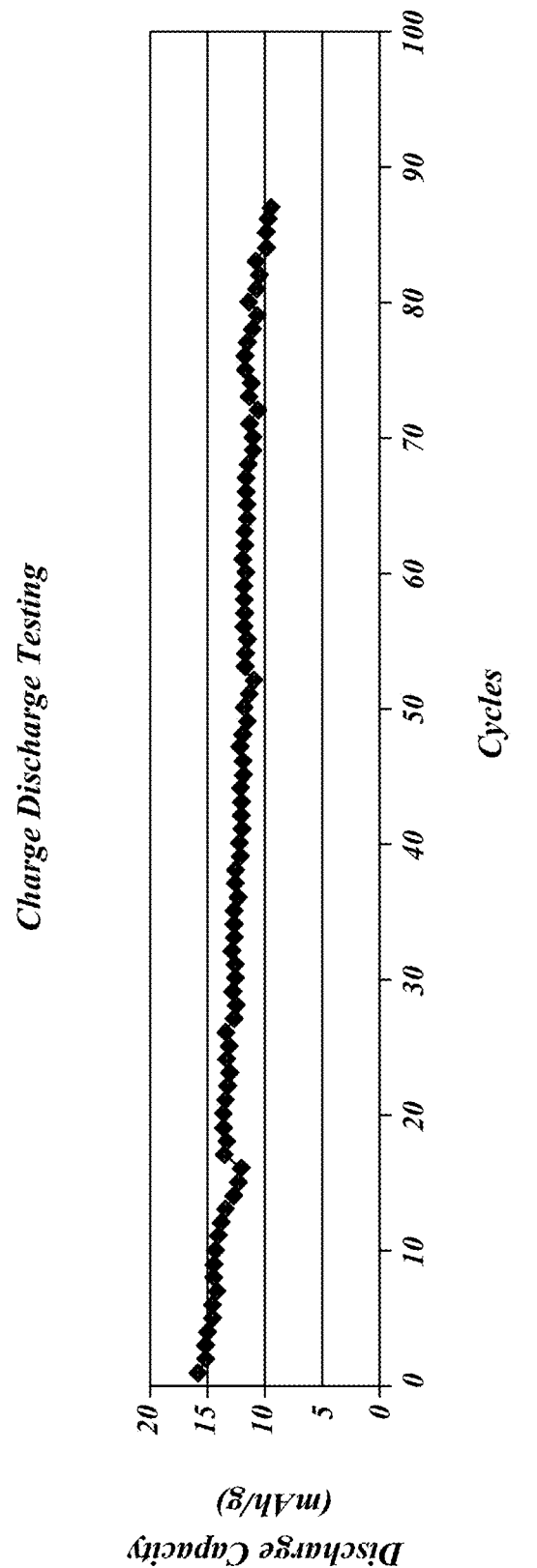
FIG. 6 is a plot of the discharge capacity at an average rate of C/9.

The resulting electrodes were then tested in a pouch cell configuration against a lithium nickel manganese cobalt oxide (NMC) cathode. A typical cycling graph is shown in FIG. 6.

Example 6

In Example 6, polyimide liquid precursor (PI 2611 from HD Microsystems corp.), graphite particles (SLP30 from Timcal corp.), and silicon microparticles (from Alfa Aesar corp.) were mixed together for 5 minutes using a Spex 8000D machine in the weight ratio of 200:10:70. The mixture was then cast onto aluminum foil and allowed to dry in a 90° C. oven, to drive away solvents (e.g., NMP). The dried mixture was cured at 200° C. in a hot press, under negligible pressure, for at least 12 hours. The aluminum foil backing was then removed by etching in a 12.5% HCl solution. The remaining film was then rinsed in DI water, dried and then pyrolyzed at 1175° C. for about one hour under argon flow. The process resulted in a composition of 15.8% of PI 2611 derived carbon, 10.5% of graphite particles, 73.7% of silicon by weight.

Figure 7:
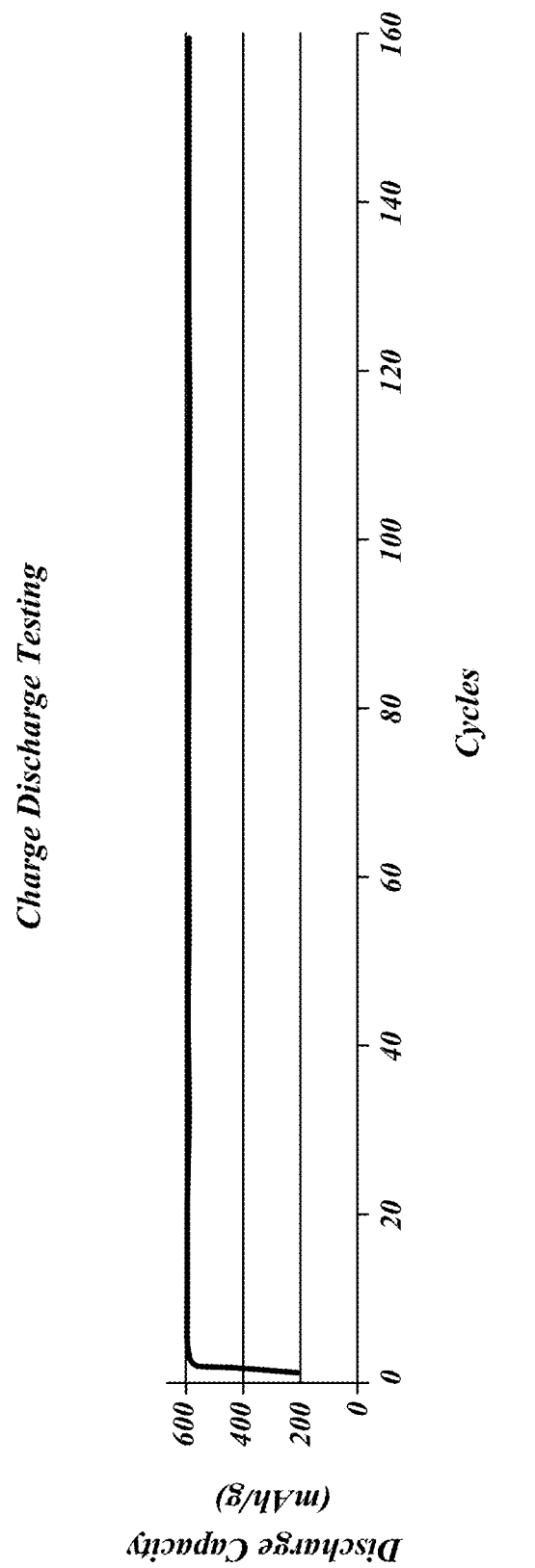
FIG. 7 is a plot of the discharge capacity.

The resulting electrodes were then tested in a pouch cell configuration against a lithium NMC oxide cathode. The anodes where charged to 600 mAh/g each cycle and the discharge capacity per cycle was recorded. A typical cycling graph is shown in FIG. 7.

Example 7

Figure 8:
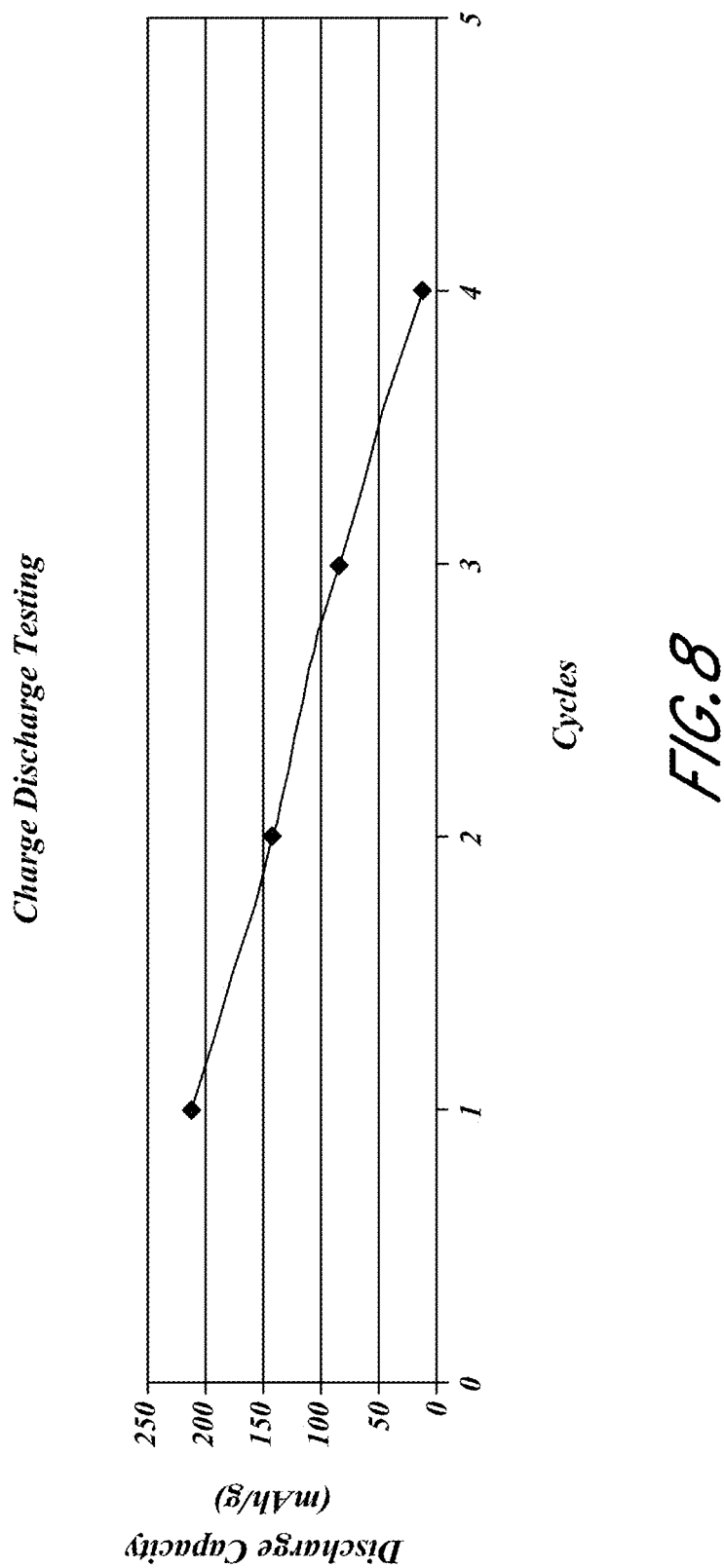
FIG. 8 is a plot of the discharge capacity at an average rate of C/9.

In Example 7, PVDF and silicon particles (from EVNANO Advanced Chemical Materials Co), conductive carbon particles (Super P from Timcal corp.), conductive graphite particles (KS6 from Timcal corp.), graphite particles (SLP30 from Timcal corp.) and NMP were mixed in the weight ratio of 5:20:1:4:70:95. The mixture was then cast on a copper substrate and then placed in a 90° C. oven to drive away solvents, e.g., NMP. The resulting electrodes were then tested in a pouch cell configuration against a lithium NMC Oxide cathode. A typical cycling graph is shown in FIG. 8.

Example 8

Multiple experiments were conducted in order to find the effects of varying the percentage of polyimide derive carbon (e.g. 2611c) while decreasing the percentage of graphite particles (SLP30 from Timcal corp.) and keeping the percentage of silicon microparticles (from Alfa Aesar corp.) at 20 wt. %.

Figure 9A:
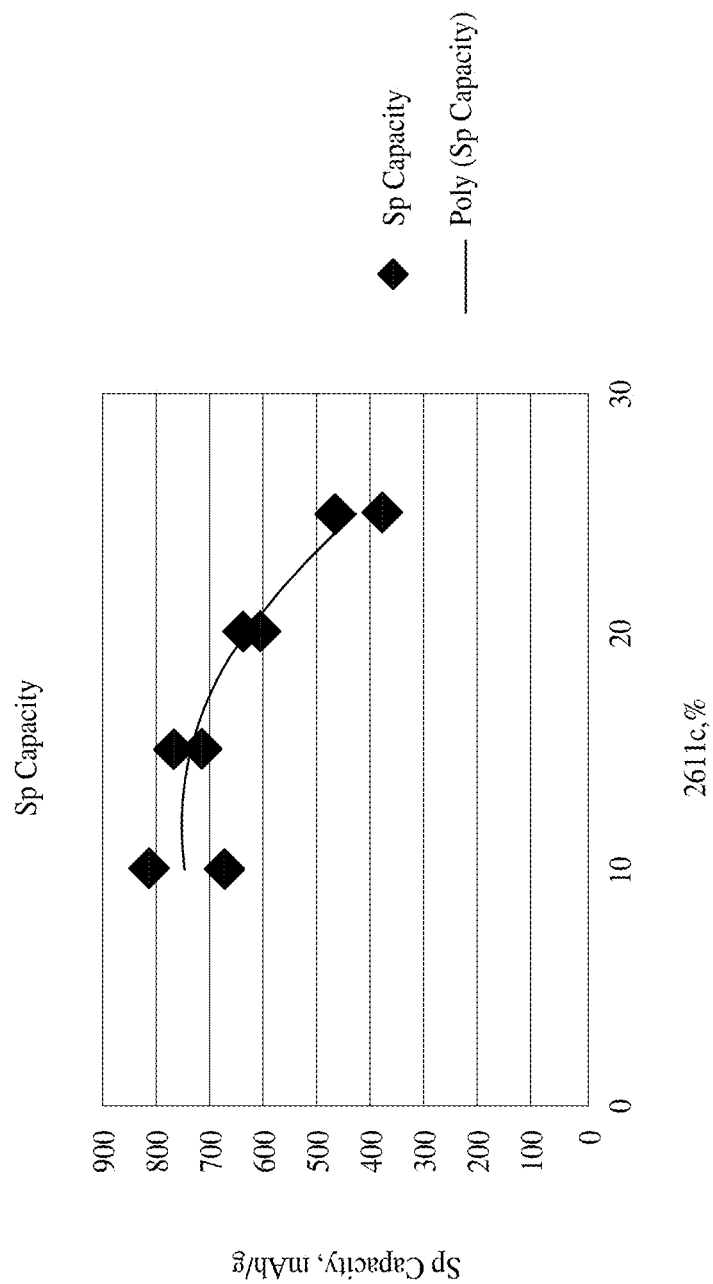
FIGS. 9A and 9B are plots of the reversible and irreversible capacity as a function of the various weight percentage of PI derived carbon from 2611c and graphite particles for a fixed percentage of 20 wt. % Si.
Figure 9B:
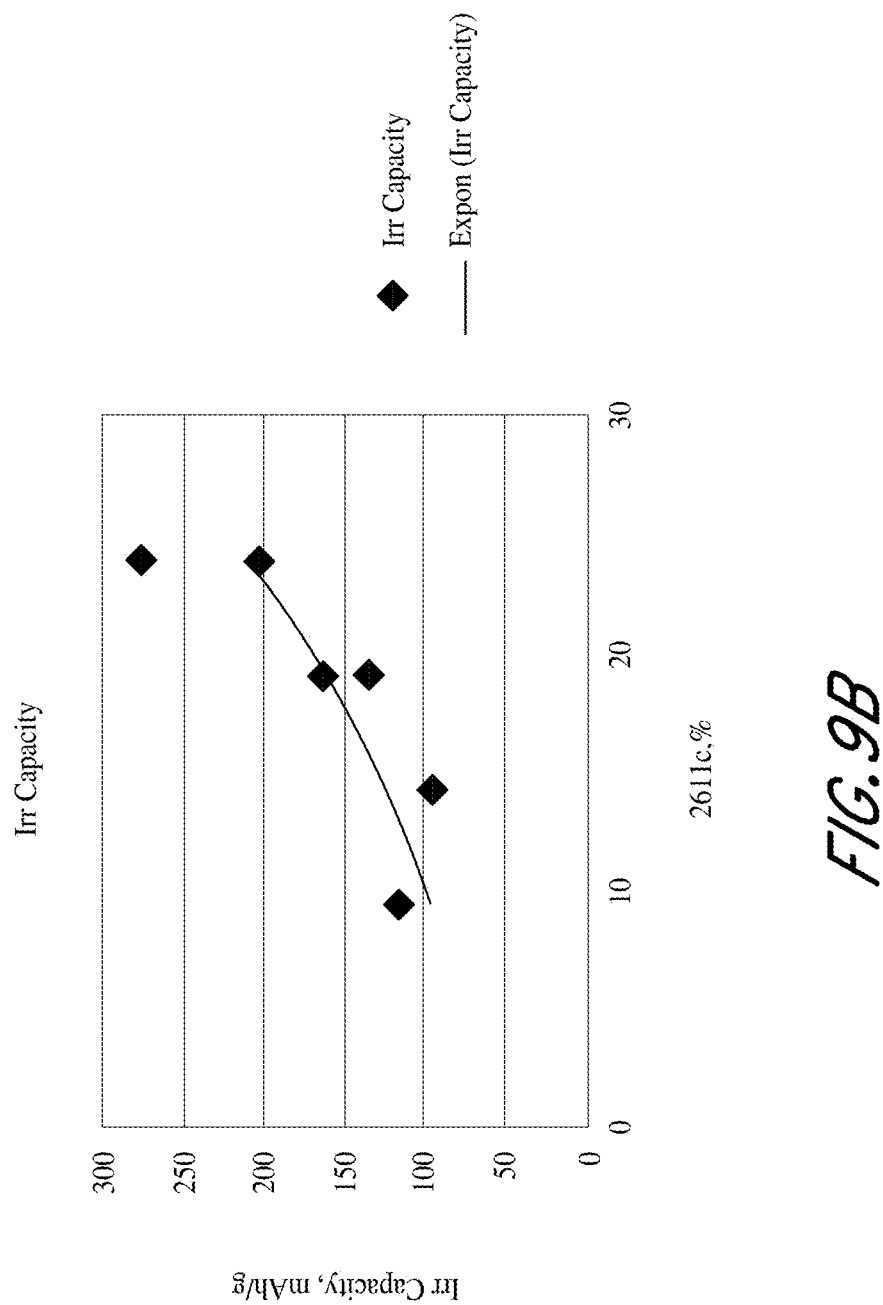

As shown in FIGS. 9A and 9B, the results show that more graphite and less 2611c was beneficial to cell performance by increasing the specific capacity while decreasing the irreversible capacity. Minimizing 2611c adversely affected the strength of the resultant anode so a value close 20 wt. % can be preferable as a compromise in one embodiment.

Example 9

Figure 10:
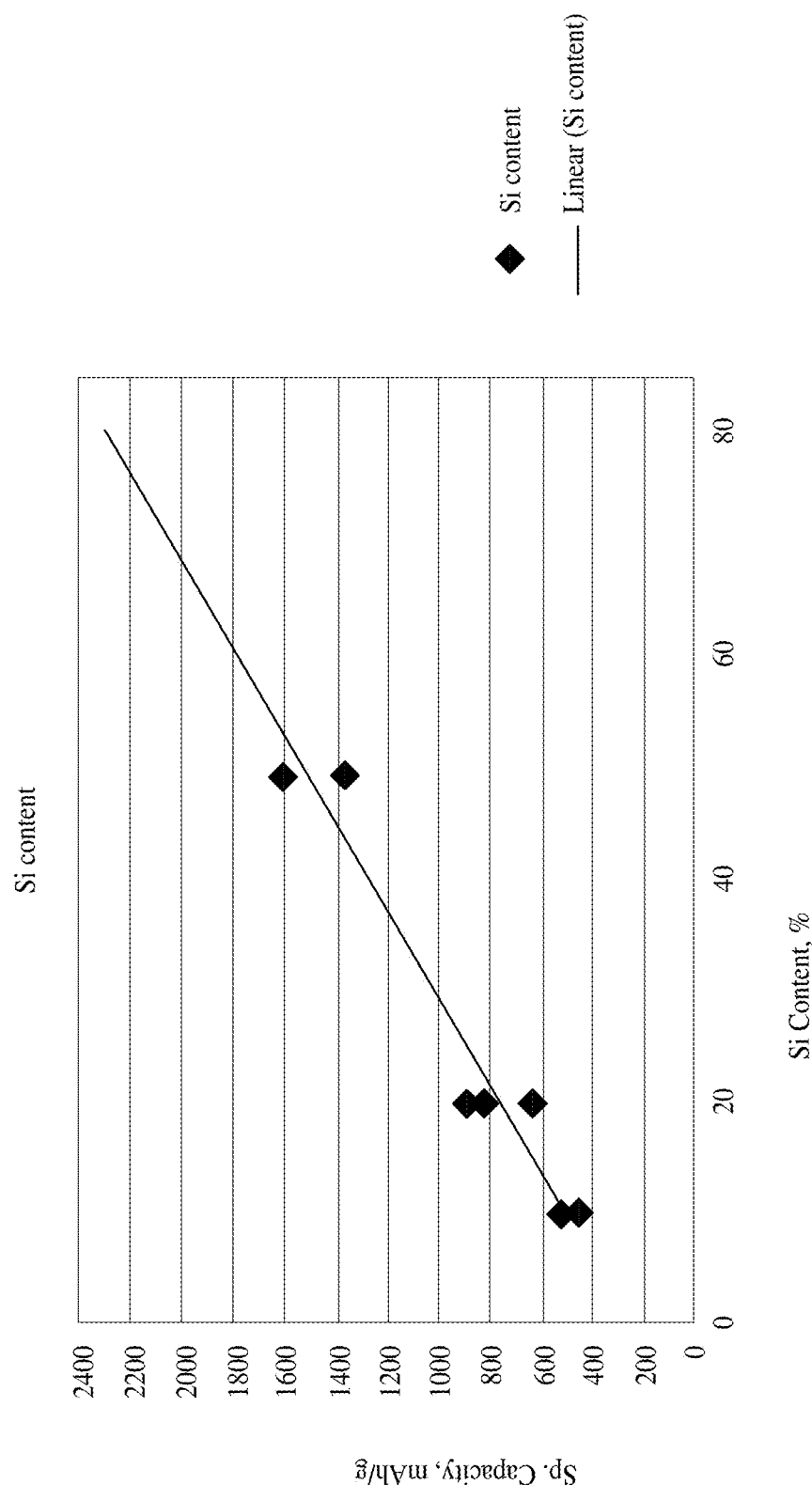
FIG. 10 is a plot of the first cycle discharge capacity as a function of weight percentage of carbon.

Similarly to example 8, if 2611c is kept at 20 wt. % and Si percentage is increased at the expense of graphite particles, the first cycle discharge capacity of the resulting electrode is increased. FIG. 10 shows that a higher silicon content can make a better performing anode.

Example 10

Figure 11:
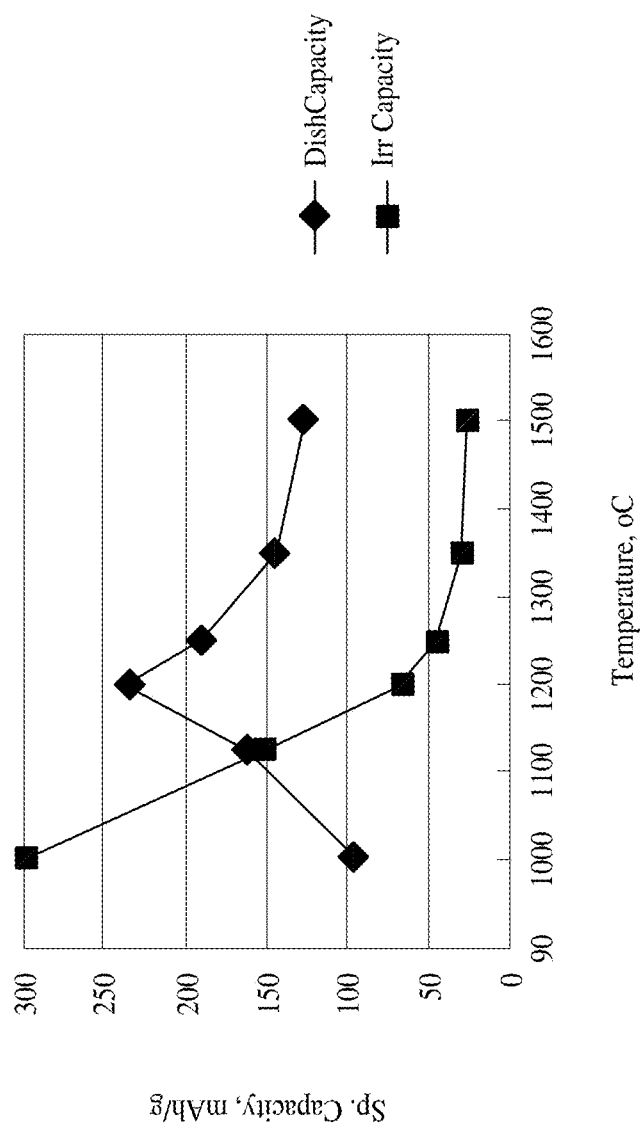
FIG. 11 is a plot of the reversible (discharge) and irreversible capacity as a function of pyrolysis temperature.

When 1 mil thick films of polyimide are pyrolized and tested in accordance with the procedure in Example 1. The reversible capacity and irreversible capacity were plotted as a function of the pyrolysis temperature. FIG. 11 indicates that, in one embodiment, it is preferable to pyrolyze polyimide films (Upilex by UBE corp) at around 1175° C.

ADDITIONAL EXAMPLES

Figure 12:
FIG. 12 is a photograph of a 4.3 cm×4.3 cm composite anode film without a metal foil support layer.

FIG. 12 is a photograph of a 4.3 cm×4.3 cm composite anode film without a metal foil support layer. The composite anode film has a thickness of about 30 microns and has a composition of about 15.8% of PI 2611 derived carbon, about 10.5% of graphite particles, and about 73.7% of silicon by weight.

Figure 13:
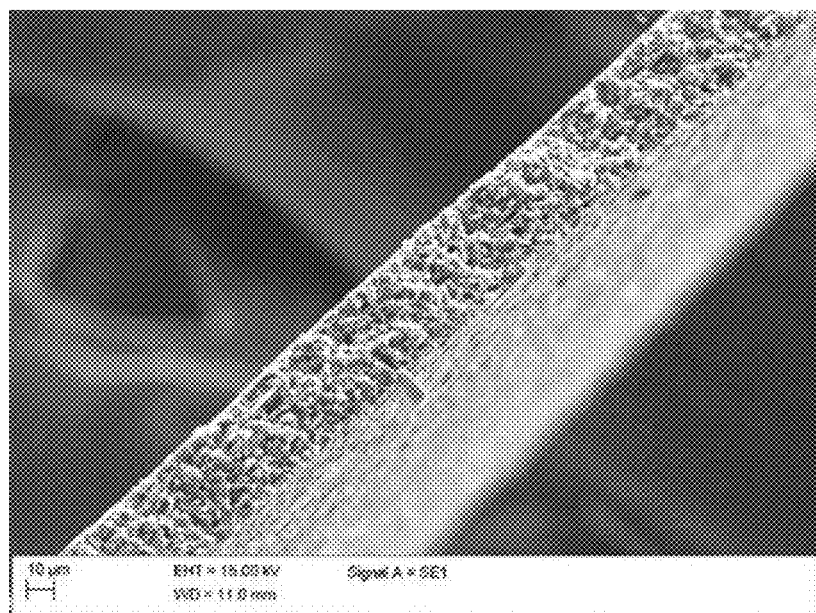
FIG. 13 is a scanning electron microscope (SEM) micrograph of a composite anode film before being cycled (the out-of-focus portion is a bottom portion of the anode and the portion that is in focus is a cleaved edge of the composite film)
Figure 14:
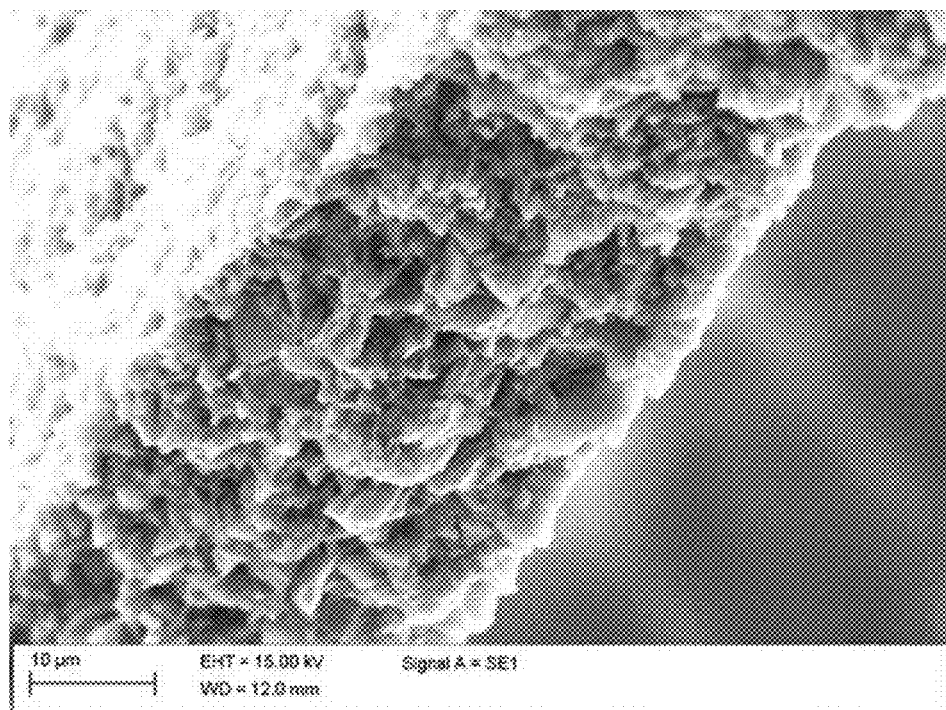
FIG. 14 is another SEM micrograph of a composite anode film before being cycled.
Figure 15:
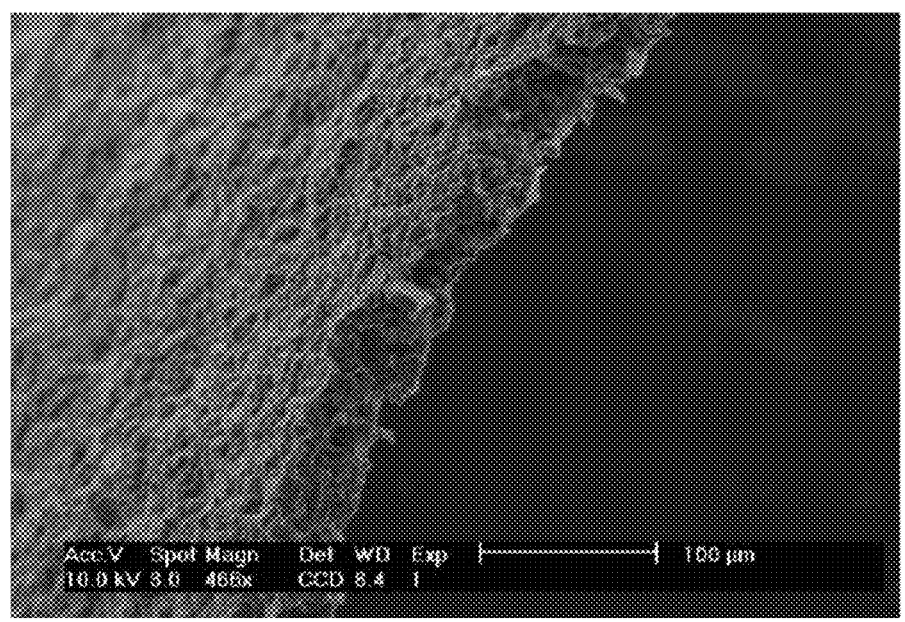
FIG. 15 is a SEM micrograph of a composite anode film after being cycled 10 cycles.
Figure 16:
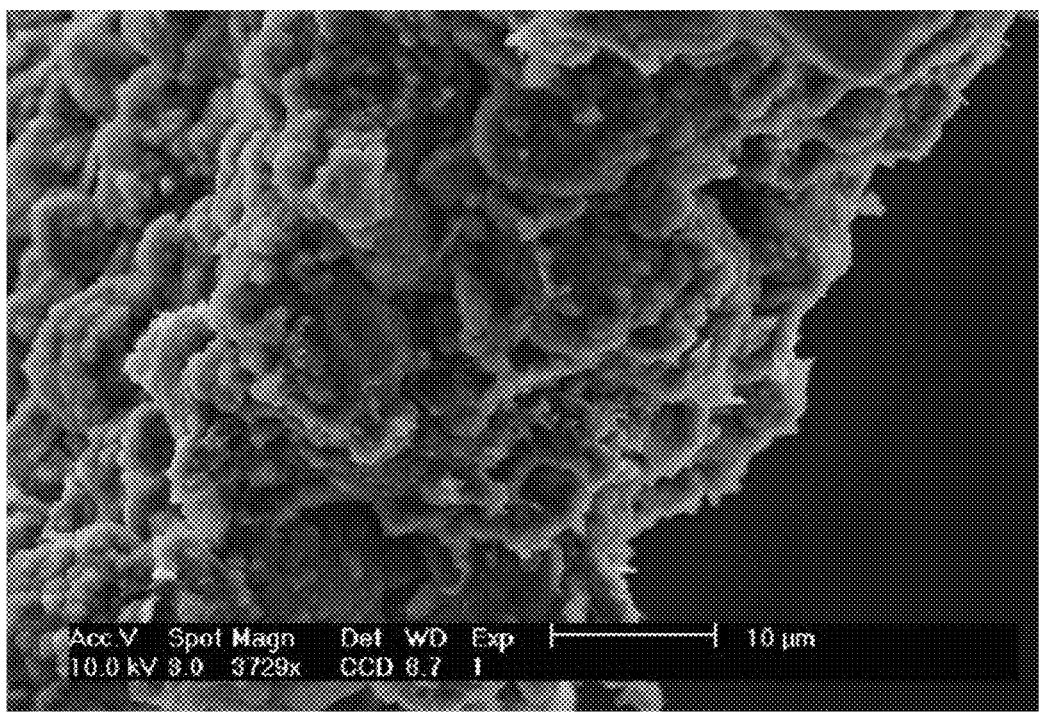
FIG. 16 is another SEM micrograph of a composite anode film after being cycled 10 cycles.
Figure 17:
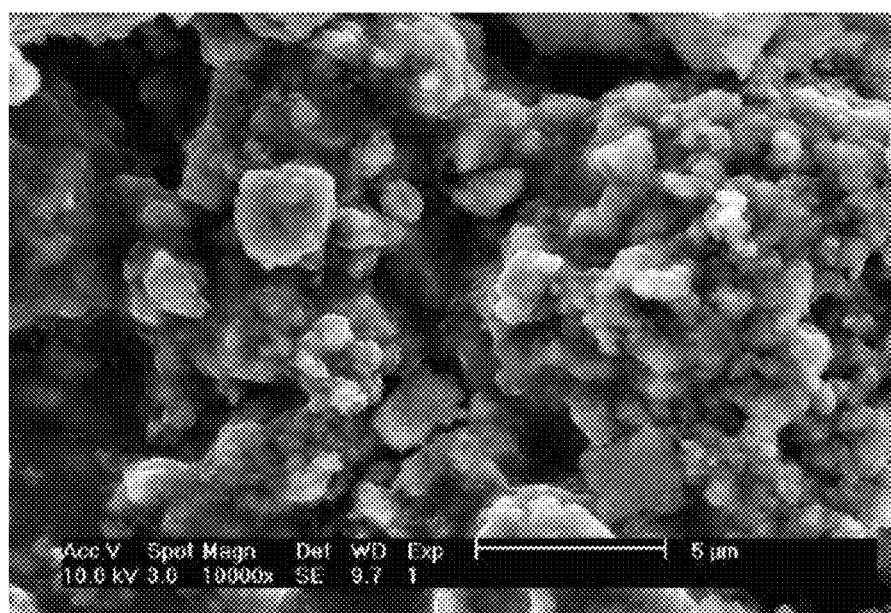
FIG. 17 is a SEM micrograph of a composite anode film after being cycled 300 cycles.
Figure 18:
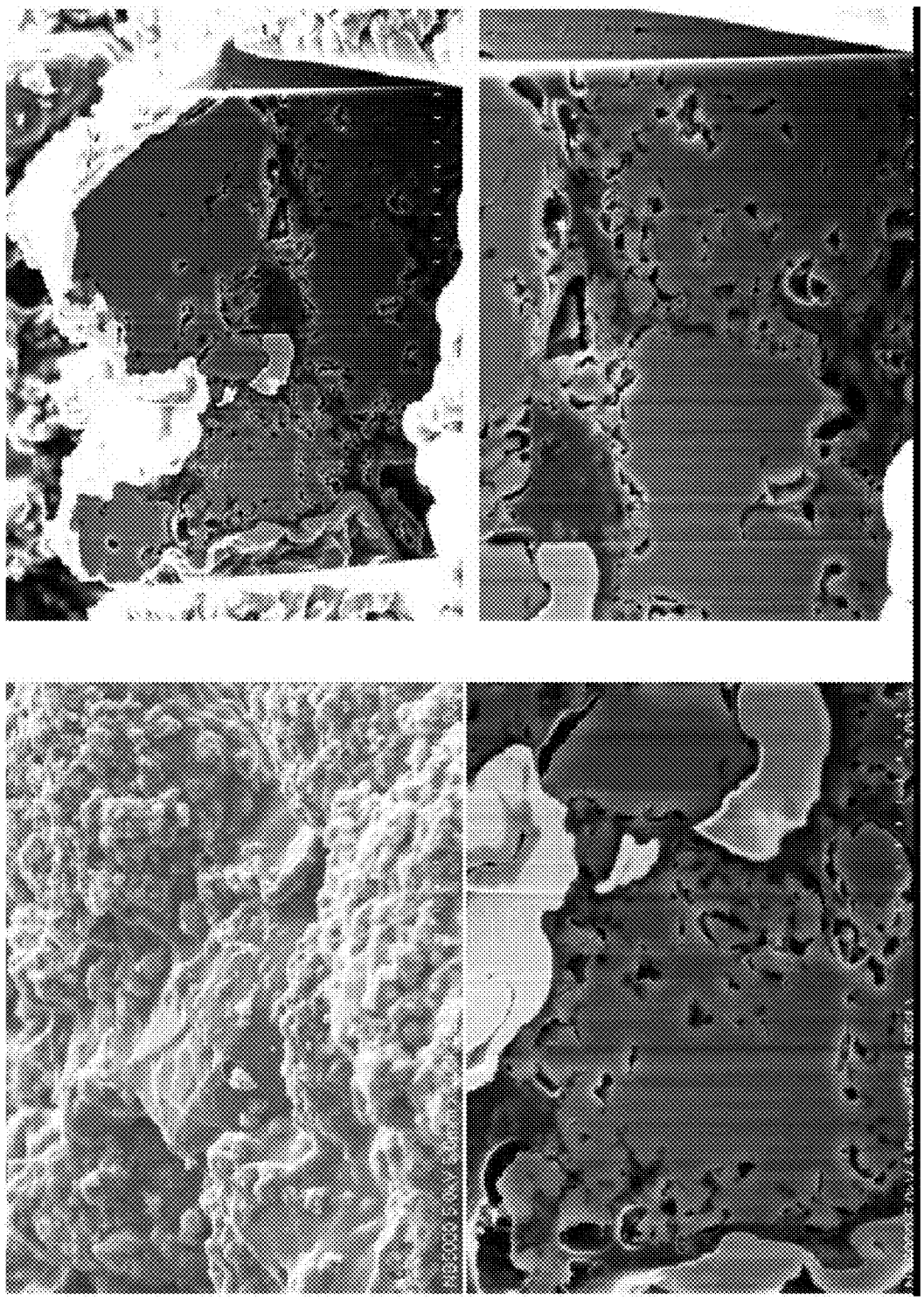
FIG. 18 includes SEM micrographs of cross-sections of composite anode films.

FIGS. 13-18 are scanning electron microscope (SEM) micrographs of a composite anode film. The compositions of the composite anode film were about 15.8% of PI 2611 derived carbon, about 10.5% of graphite particles, and about 73.7% of silicon by weight. FIGS. 13 and 14 show before being cycled (the out-of-focus portion is a bottom portion of the anode and the portion that is in focus is a cleaved edge of the composite film). FIGS. 15, 16, and 17 are SEM micrographs of a composite anode film after being cycled 10 cycles, 10 cycles, and 300 cycles, respectively. The SEM micrographs show that there is not any significant pulverization of the silicon and that the anodes do not have an excessive layer of solid electrolyte interface/interphase (SEI) built on top of them after cycling. FIG. 18 are SEM micrographs of cross-sections of composite anode films.

II. Electrodes and Electrochemical Cells

As described above, anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. Silicon, however, swells in excess of 300% upon lithium insertion. When the anode expands, it is often difficult to maintain sufficient adhesion between the silicon and the current collector. In addition to this, the silicon-based anode may wrinkle due to the expansion of the anode and/or the friction between the anode and the other parts of the cell. This wrinkling causes the battery to swell in thickness and should be avoided in order for the battery to have a high volumetric energy density. The wrinkling also causes the interface between layers (e.g. anodes, cathodes, and separator) to be uneven. As a result, uneven usage of the active material within a cell and other issues could occur due to nonuniform distances between the opposing active materials.

Described herein are certain embodiments of electrodes (e.g., anodes and cathodes), electrochemical cells, and methods of forming electrodes and electrochemical cells that may include a carbonized polymer. For example, mixtures, carbon composite materials, and carbon-silicon composite materials described above and in U.S. Patent Application Publication No. 2011/0177393, the entirety of which is hereby incorporated by reference, can be used in certain electrodes, cells, and methods described below.

The electrode described herein is different from the electrodes used in certain conventional cells in at least the following ways: (1) The active material portion is a solid film instead of being a coating that is coated in a liquid form onto the foil, and (2) the attachment substance is a substance that is not originally included within the active material solid film before attachment. Certain conventional electrode coatings are attached to the current collector foil by a binder such as PVDF which is part of the electrode coating itself. In some cases, another coating such as carbon is used to stabilize the interface between the active material coating and the current collector. For example, carbon may be a component of the electrode coating. Also, the material that adheres the coating to the current collector is still the PVDF even in the case where there is a carbon coating on the current collector.

After the material (e.g., silicon composite material) has been formed into a shape such as a film, the material can be used in an electrochemical cell (e.g., battery). In certain embodiments, the film has a thickness of about 10 to about 150 microns, and in further embodiments, the film has a thickness of about 15 to about 45 microns.

Figure 19:
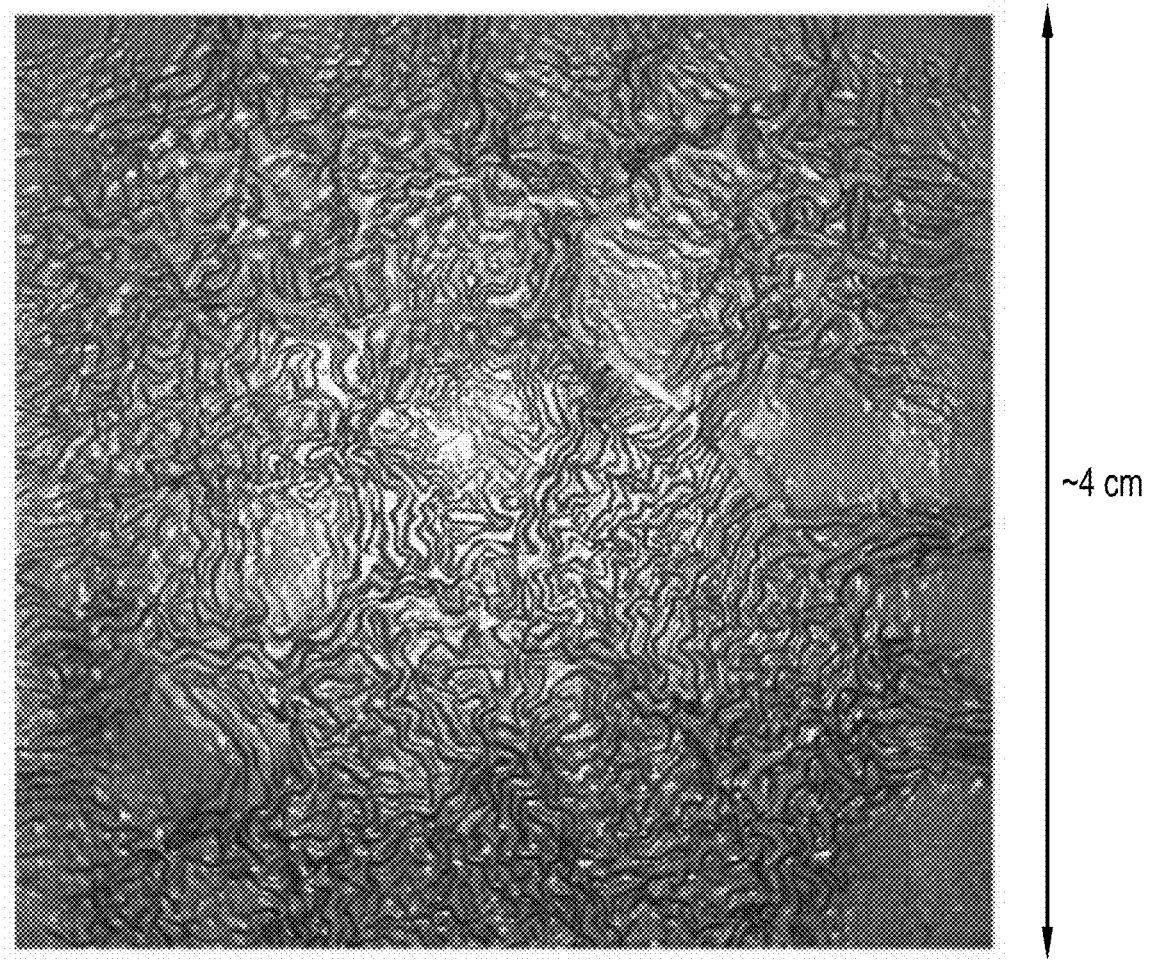
FIG. 19 is a photograph of composite film showing wrinkles formed in the film as a result of cycling.

During use of the electrochemical cell, the cell is cycled wherein the silicon composite material absorbs and desorbs lithium during charging and discharging of the cell. Since silicon can swell in excess of 300% upon lithium insertion, relatively large volumetric changes can occur in the electrode during absorption and desorption of lithium. In embodiments where the silicon composite material is formed into films (e.g., sheets), the increase in volume of the film can result in wrinkling of the film. FIG. 19 is a photograph of an example of a film with wrinkles. Wrinkles in the film can result in non-uniform lithiation of the electrochemically active material (e.g., silicon composite material). The film may also be coupled or attached to a current collector (e.g., copper sheet). Wrinkling of the film can, for example, result in delamination of the film from the current collector and loss of ability to collect electrical current.

Described below are methods of forming the film that results in no wrinkling or substantially no wrinkling of the film during cycling or lithiation. In addition, methods of attaching the film to a current collector are described as well as methods of attaching an electrode (e.g., anode and cathode) to a separator. Each of these methods can be used individually or in combination with the other methods to improve performance of an electrochemical cell.

Electrode Attachment Substance for Adhering a Film of Electrochemically Active Material to a Current Collector An attachment (e.g., adhesive) substance can be used to couple or adhere a film that includes electrochemically active material (e.g., silicon composite material) to a current collector (e.g., copper sheet or foil). The electrode attachment substance can adhere the film and current collector together to prevent delamination between them. The electrode attachment substance can be placed or sandwiched between the film and the current collector to form the electrode. Therefore, the electrode can include the film, the attachment substance, and the current collector. In addition, the electrode can include a film with an electrochemically active material on both sides of the current collector. For example, a first electrode attachment substance can be sandwiched between a first film with an electrochemically active material and a first side of the current collector, and a second electrode attachment substance can be sandwiched between a second film with an electrochemically active material and a second side of the current collector.

The film may include porosity such as discussed above. Embodiments may include porosity of about 1% to about 70% or about 5% to about 50% by volume porosity. The electrode attachment substance may at least partially be absorbed into the porosity such that at least some of the electrode attachment substance is within the porosity of the film. Without being bound by theory, the electrode attachment substance may be absorbed into the porosity by capillary action. For example, a solution with the electrode attachment substance can be absorbed into the porosity, and the solution can be dried, leaving the attachment substance within the porosity of the film. The electrode attachment substance within the porosity of the film can increase the mechanical durability of the film. As such, the film can result in a composite film that includes the electrode attachment substances. Furthermore, the electrode attachment substance may extend through the entire thickness of the film. For example, a substantial portion of the porosity may be open such that the film is permeable to a solution that includes the electrode attachment substance. Thus, the electrode attachment substance may be a continuous phase within the film. In other embodiments, the electrode attachment substance may only extend partially through or into the thickness of the film.

In certain embodiments, the electrode attachment substance is substantially electrically nonconductive (e.g., the electrode attachment substance has an electrically conductivity such that, in use of the adhesive substance in an electrochemical cell, the attachment substance does not conduct electricity). Although the electrode attachment substance may be substantially electrically nonconductive, the electrochemical cell can result in better performance than if the electrode attachment substance was electrically conductive. Without being bound by theory, absorption of the electrode attachment substance may result in portions of the film physically contacting the current collector.

The electrode attachment substance may be a polymer. In certain embodiments, the electrode attachment substance includes polyamideimide (PAI) or is PAI. In further embodiments, electrode attachment substance includes polyvinylidene fluoride (PVDF) or is PVDF, includes carboxymethyl cellulose (CMC) or is CMC, or includes polyacrylic acid (PAA) or is PAA. The electrode attachment substance may also be other materials that provide sufficient adhesion (e.g., bonding strength) to both the current collector and the film that includes electrochemically active material. Additional examples of chemicals that can be or be included in the electrode attachment substance include styrene butadiene rubber (SBR), polypyrrole (PPy), poly(vinylidene fluoride)-tetrafluoroethylene-propylene (PVDF-TFE-P), polyacrylonitrile, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polymethacrylic acid, nitrile-butadiene rubber, polystyrene, polycarbonate, and a copolymer of vinylidene fluoride and hexafluoro propylene. The electrode attachment substance may be a thermoset polymer or a thermoplastic polymer, and the polymer may be amorphous, semi-crystalline, or crystalline.

Pressure may be applied to press the current collector and the film together with the electrode attachment substance between. In certain embodiments, significant reduction in wrinkling is achieved when pressures above 1 bar are applied and better results may occur when pressure above 2 bars is applied. Pressure can be applied, for example, by putting the film, electrode attachment substance, and current collector through rolls such as calendaring rolls.

Another advantage to using an electrode attachment substance between the film and the current collector is that the complete assembly can be more flexible than the film without the current collector and attachment substance. For example, in certain embodiments, the film can be brittle and cannot be deformed (e.g., bent) significantly without cracking and failure of the film. When the same film is coupled with or attached to a current collector with the electrode attachment substance, the complete assembly can be bent or deformed to a further extent compared to a film that is not coupled with or attached to a current collector without cracking or failure of the film. In certain embodiments, an electrode where the minimum radius of curvature before cracking is about 7 mm can be wrapped around a radius of about 1 mm after the attachment and calendaring has taken place. Advantageously, the complete electrode assembly can be rolled to form a rolled-type (e.g., wound) battery.

There are a number of methods of making an electrode with an electrode attachment substance adhering the film and current collector together. Described below are a number of examples. In certain examples, a solution of an electrode attachment substance and a solvent is made. For example, the electrode attachment substance can include PAI and the solvent can include N-methyl pyrrolidone (NMP). The solution can be applied or coated onto the current collector and/or the film. In certain embodiments, the coating of solution has a thickness of about 1 µm to about 100 µm. For example, the coating of solution may have a thickness of about 50 µm. The film and current collector can then be placed into contact with one another such that the solution is sandwiched between the film and current collector. As described above, at least some of the solution may be absorbed into porosity of the film. Since the solution may be absorbed into the film, the amount of solution coated onto the current collector or film may vary depending on the thickness and porosity of the film. Excess solution may be blotted using an absorbent material. The solution can then go through one or more drying steps to remove the solvent from the solution leaving the electrode attachment sub stance.

Another method of forming an electrode with an electrode attachment substance adhering the film to the current collector includes using an electrode attachment substance that is in a substantially solid state and heating the electrode attachment substance to adhere the film to the current collector. In some instances, heating can include heat laminating, e.g., roll pressing or flat pressing, which can allow for easier manufacturing. The current collector can be a typical current collector, for example, a metal foil (e.g., a copper foil). The film can include an electrochemically active material. For example, the film can include the composite materials described herein, e.g., silicon composite materials, carbon composite materials, and/or silicon-carbon composite materials. Thus, in certain embodiments, the film can include a carbon phase that holds the film together. The film can also include silicon and can be for an anode or cathode.

In certain embodiments, the electrode attachment substance can be disposed or sandwiched between the film and the current collector. For example, the method of forming an electrode can include providing a current collector with a first electrode attachment substance on a first side of the current collector. The first electrode attachment substance can be in a substantially solid state. The method also can include disposing a first solid film comprising electrochemically active material on the first electrode attachment substance. Furthermore, the method can include heating the first electrode attachment substance to adhere the first solid film to the current collector. In some embodiments, heating comprises heat laminating, roll pressing, or flat pressing.

Compared to certain embodiments using a polymer adhesive solution process (e.g., a wet process) to bond films to a current collector, the embodiments using an electrode attachment substance in a substantially solid state (e.g., a substantially dry process) can form a more or substantially uniform layer of the adhesive between the film and the current collector. For example, the substantially dry process can reduce potential non-uniformity of the adhesive between the film and current collector on the micron scale (e.g., reducing possible "columns" of polymer adhesive separated by voids on the micron scale). In some examples, the electrode attachment substance can form a substantially uniform layer, for example, of a thermoplastic polymer. The substantially uniform layer can be disposed substantially over an entire surface of the film. In some embodiments, using an electrode attachment substance that is in a substantially solid state can also reduce the distribution of adhesive throughout the interior void space (such as within the pores) of a composite film. For example, the solid film of the electrode described herein can include porosity. In the embodiments formed by the substantially dry process, a majority of the porosity can be substantially free of the attachment substance. For example, at least about 60%, at least about 65%, at least about 70%, at least about 75%, at least about 80%, at least about 85%, at least about 90%, at least about 95%, at least about 97%, at least about 98%, or at least about 99% of the porosity can be substantially free of the attachment substance.

Additionally, using an electrode attachment substance that is in a substantially solid state can reduce the deposition of adhesive on the surfaces of the film which are not in contact with the current collector. The electrode attachment substance on the film may in some cases, limit the use of some coated separator materials due to possible incompatibility between the polymer on the separator and the electrode attachment substance that may be on the film. Thus, certain embodiments can form an electrode with surfaces of the film substantially free of the electrode attachment substance, thereby reducing or substantially eliminating the polymer incompatibility issue. In some embodiments, polymers that are not soluble in nonaqueous electrolyte solutions (such as electrolytes made with carbonate solvents) can be used. For example, polymers such as PAI or PVDF can be used. Furthermore, some soluble polymers may not have enough adhesion strength to maintain electrical contact during electrochemical testing. By using an electrode attachment substance that is in a substantially solid state, a variety of non-soluble polymers (in aqueous or nonaqueous solutions) may also be used. For example, any electrochemically appropriate thermoplastic polymer, including non-soluble thermoplastic materials such as polyethylene and polypropylene, can be used.

In some embodiments of formed electrodes, the electrode attachment substance can be substantially electrically nonconductive (e.g., the electrode attachment substance has an electrically conductivity such that, in use of the adhesive substance in an electrochemical cell, the attachment substance does not conduct electricity). Although the electrode attachment substance may be substantially electrically nonconductive, an electrochemical cell incorporating certain embodiments of the formed electrode can result in a better performance including, but not limited to, lower irreversible capacity than if the electrode attachment substance was made electrically conductive. For example, in some embodiments including an electrode attachment substance that is electrically conductive, conductive particles in the attachment substance may make it harder for the composite material in the solid film to contact the current collector. Without being bound by theory, during the heated lamination process, portions of composite material in the solid film may be able to penetrate the substantially solid electrode attachment substance and come in direct contact with the current collector, thus allowing the electrons to travel directly from the film to the current collector.

Furthermore, certain embodiments of electrochemical cells incorporating certain embodiments of the formed electrode can retain good mechanical integrity after cycling. For example, during cycling, assemblies may deteriorate with the composite film delaminating from the current collector. Composite films may also flake away from the current collector when the assembly bends below a certain radius, which may preclude winding as a cell assembly method. In certain embodiments, the electrode assembly can be assembled into a cell using winding.

As described herein, certain embodiments of electrodes formed using a solution process (e.g., a wet process) for attaching the composite films to the current collector may be able to be bent to a radius of curvature of at least 7 mm without significant cracking. Certain embodiments of electrodes formed using an attachment substance in a substantially solid state (e.g., a substantially dry process), can allow for an even smaller bend radius, e.g., to at least about 3 mm, to at least about 2.5 mm, to at least about 2 mm, to at least about 1.5 mm, or to at least about 1 mm, without delamination during cycling. Furthermore, the first-charge irreversible capacity can also be reduced, e.g., from about 15% (using a wet process) to about 10% (using a substantially dry process), which can effectively increase the achievable volumetric energy density.

In some embodiments using a substantially dry process, the adhesion may be stronger than in some embodiments using a wet process. Without being bound by the theory, adhesive materials are conveyed by capillary action in the wet process and are "wicked away" by the porosity in the composite material, which result in a weaker lamination. During the manufacturing process, the electrode may undergo a punching process in some embodiments, and the punching itself may actually cause physical damage to the edges of the electrodes. The active material located in the damaged edges may be dislocated from the surface. Thus, some active material that has reacted with lithium would get electrically removed from the system. As a result, capacity loss may result when lithium is isolated from the rest of the system. On the other hand, the adhesive in a substantially solid process is available to form a stronger bond, thus reduce or eliminate the damages to the edges during electrode punching. By reducing or substantially eliminating the damage to the edges of the electrodes, the first-charge irreversible capacity can be reduced.

The formed electrode can also include a film with an electrochemically active material on both sides of the current collector. For example, a first electrode attachment substance can be sandwiched between a first film with an electrochemically active material and a first side of the current collector, and a second electrode attachment substance can be sandwiched between a second film with an electrochemically active material and a second side of the current collector. Thus, the method of making an electrode also can include providing a second electrode attachment substance on a second side of the current collector. The second electrode attachment substance can be in a substantially solid state. The method also can include disposing a second solid film including electrochemically active material on the second electrode attachment substance. The method further can include heating the second electrode attachment substance to adhere the second solid film to the current collector. Heating the first electrode attachment substance and heating the second electrode attachment substance can occur simultaneously or sequentially. In some embodiments, the first electrode attachment substance and the second electrode attachment substance are chemically the same. In other embodiments, the first and second electrode attachment substances are chemically different from each other.

The current collector coated with a first electrode attachment substance can be provided in various ways. For example, providing the current collector with a first electrode attachment substance can include coating the current collector with a polymer solution on the first side of the current collector. The polymer solution can include any of the various examples described herein, e.g., solutions including PAI or PVDF. In contrast to some of the methods of allowing absorption of the attachment substance into porosity of the film, various methods of forming an electrode can include drying the polymer solution to form the first electrode attachment substance, e.g., in a substantially solid state.

In embodiments where an electrode attachment substance is provided on both sides of the current collector, providing the second electrode attachment substance can include coating the current collector with a polymer solution on the second side of the current collector (e.g., as described in various examples herein). In contrast to some of the methods of allowing absorption of the attachment substance into porosity of the film, various methods can include drying the polymer solution to form the second electrode attachment substance, e.g., in a substantially solid state.

As described herein, because the first and/or second electrode attachment substance can be in a substantially solid state, non-soluble polymers, e.g., non-soluble thermoplastic materials such as polyethylene or polypropylene, can be used. In certain such embodiments, the polymer can be coated on a current collector using an extrusion process instead of a solution process. For example, providing a current collector with the first electrode attachment substance can include providing a polymer resin on the first side of the current collector and extrusion coating the polymer resin to form the first electrode attachment substance, e.g., in a substantially solid state. In embodiments where an electrode attachment substance is provided on both sides of the current collector, providing the second electrode attachment substance can include providing a polymer resin on the second side of the current collector and extrusion coating the polymer resin to form the second electrode attachment substance, e.g., in a substantially solid state. The type and thickness of the polymer resin can be selected based on the desired end product. Other methods of providing a first or second electrode attachment substance in a substantially solid state can include cold or hot calendaring the current collector with a polymer plate using a roll press or a flat press. The type and dimension (e.g., thickness) of the polymer plate can be selected based on the desired end product. Furthermore, utilizing the methods of allowing absorption of the attachment substance into porosity of the film or utilizing the methods of adhering with an attachment substance in a substantially solid state can be based on materials and/or design choices.

Polymer Cell Construction

A cell attachment substance can also be used to couple or adhere the electrode (e.g., anode and cathode) to a separator. The cell attachment substance can adhere the electrode and the separator together to prevent delamination between them. The cell attachment substance can be placed or sandwiched between the electrode and the separator. The cell attachment substance may include any electrode attachment substances described above. For example, the cell attachment substance may include PVDF or be PVDF, may include PAI or be PAI, or may include or be CMC. In some embodiments, the method of adhering an electrode to a separator may involve a cell attachment substance in a substantially solid state. The separator material would therefore have a melting temperature higher than that of the polymer in the attachment substance.

Since ions pass through the separator between the anode and cathode, the cell attachment substance also allows ions to pass between the anode and cathode. Therefore, the cell attachment substance can be conductive to ions or porous so that ions can pass through the cell attachment substance.

Furthermore, a solution or resin may be made with the cell attachment substance and a solvent and methods of attaching the electrode to the separator may be similar to that described for attaching the film and current collector with the electrode attachment substance. Described below also are a number of examples.

Methods of Using Pressure to Form Silicon Composite Materials and Methods to Ensure that Cells that Include Silicon Composite Materials are Kept Free of Wrinkles, Flat, and Thin In certain embodiments, pressure is applied to the cell during formation of the carbon composite material. A mixture can be cast onto a substrate to form a coating on the substrate. The mixture can then be dried to remove solvents, and the dried mixture (e.g., precursor film) can then be cured. The precursor film then goes through pyrolysis to convert the precursor film to the final composite film (e.g., anode film). In some embodiments, the precursor film is heated to about 900 to 1350° C. While the precursor film is being pyrolysed, pressure can be applied to the film. In certain embodiments, a pressure greater than about 2 bars is applied.

Advantageously, films that are pyrolysed under pressure remain flat and substantially wrinkle free during cycling or lithiation. Even without the pressure applied during lithiation, the films can remain substantially free of wrinkles. Although, in certain embodiments, pressure may be applied during the initial formation (e.g., first charge) and initial cycling of the electrochemical cell as well as during pyrolysis of the mixture. Without being bound by theory, it is believed that the wrinkles form during the first expansion and first few cycles of the electrode and that there is delamination/wrinkling that occurs during that first charge and first few cycles. Applying pressure to prevent delamination may be a reason the pressure prevents wrinkling and swelling.

EXAMPLES

The following examples are provided to demonstrate the benefits of the embodiments of electrodes and electrochemical cells. These examples are discussed for illustrative purposes and should not be construed to limit the scope of the disclosed embodiments.

Electrode with an Electrode Attachment Substance

Attaching a film with an electrochemically active material to the current collector can be performed by the following example methods. Polyamideimide (PAI) (e.g., Torlon 4000 series from Solvay) is dissolved in a solvent (N-methylpyrrolidone (NMP), dimethylacetamide (DMAC), etc.). In one example, a solution with 10 w.t. % PAI can be prepared by mixing 10 g of PAI (e.g., Torlon 4000T-HV) with 90 g of NMP in a glass bottle. The solution is mixed until a transparent PAI solution is obtained. The solution may be mixed at room temperature for about 30 minutes and then at 150° C. for about another 3 hours. The bottle may be covered by aluminum foil for better dissolving. Furthermore, the mixing can be done, for example, using a magnetic stirring bar.

An example of assembling an electrode using the PAI solution includes providing a 40×17 cm piece of copper foil with a thickness of about 10 μm. Alcohol such as ethanol or IPA can be applied to a glass table, and the copper foil can be placed over the alcohol onto the glass table. Pressure can be applied and a kimwipe can be wiped over the copper foil to remove any bubbles and excess alcohol between the copper foil and the glass table. A solution with the attachment substance such as a PAI solution can then be applied to the copper foil. For example, 4 ml of the solution can be applied. A caster with a gap of about 50 μm can be used to form a uniform coating of the solution over the copper foil. One or more films with an active material can be placed onto the solution. A lint-free cloth can be used to remove excess adhesive. The copper foil can then be removed from the glass table.

A second film with an active material can attached to the opposite side of the copper foil by placing the copper foil with the first film down on a glass table. Then a similar procedure can be used as described above to apply the solution with the attachment substance and the second film.

The assembly of the copper foil, solution, and film can be dried for about two hours at about 110° C. and then dried in a vacuum oven for about one hour at about 110° C. The drying removes the solvent leaving the attachment substance between the film and the copper foil. The film and copper foil can be pressed together during drying. For example, an adhesive loading of about 0.6 mg/cm$^2$ was used. Individual electrodes can then be cut from the dried assembly.

Figure 20:
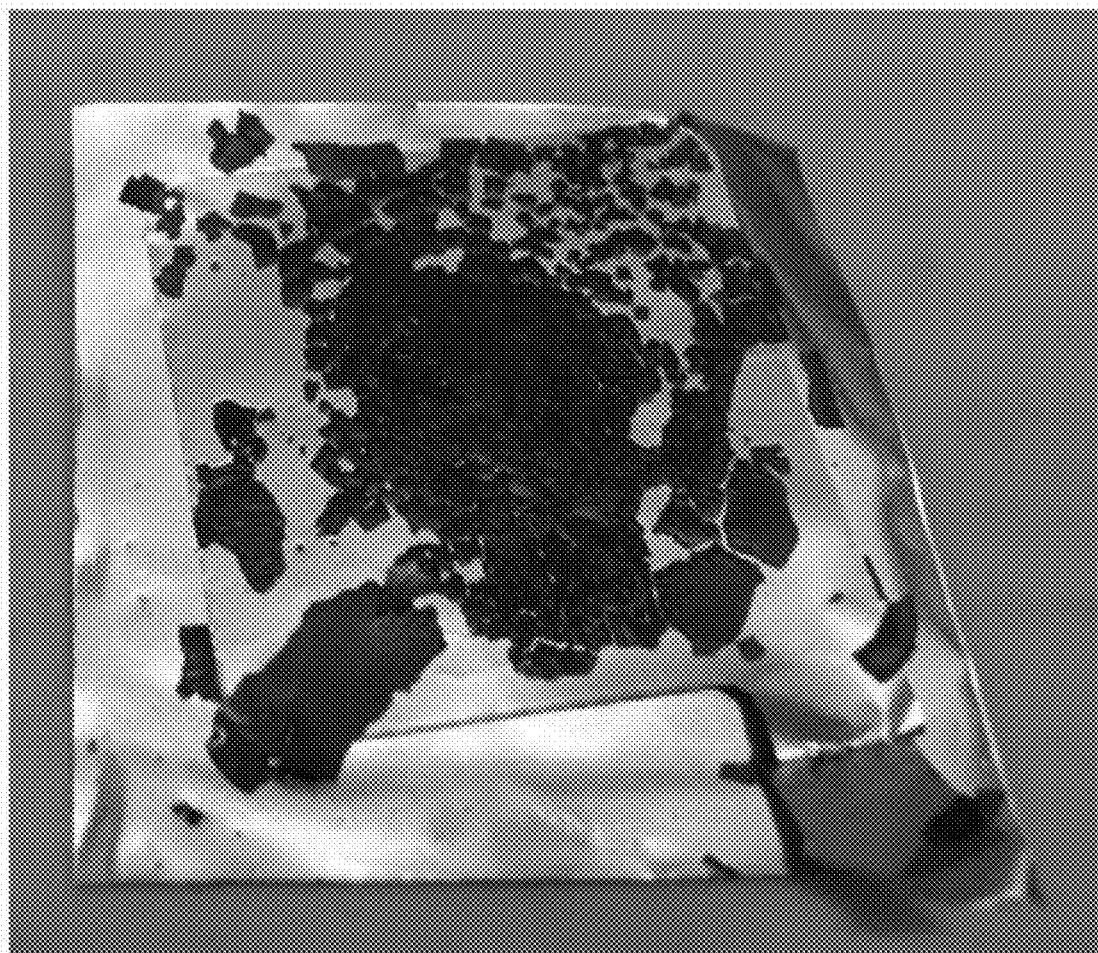
FIG. 20 is a photograph of a composite film without an electrode attachment substance showing disintegration of the film as a result of cycling.

Various attachment substances were used to create electrodes. FIG. 20 is a photograph of an anode without an electrode attachment substance in a pressure cell after being cycled. The anode disintegrated almost completely. Table I lists a number of types of attachment substances (e.g., polymers) that were tested.

TABLE I

| Type of polymer | Content of polymer (w.t. %) | Results |
|---|---|---|
| HSV-900 | 1.5, 3.0 & 5.0 | Depending on the HSV-900 content in solution but relatively weak attachment |

TABLE I-continued

| Type of polymer | Content of polymer (w.t. %) | Results |
|---|---|---|
| Solef 6020 | 1.5, 3.0, 5.0 & 7.0 | Depending on the Solef 6020 content in solution but relatively weak attachment (better than HSV-900) |
| Solef 5130 | 1.5, 3.0, 5.0 & 7.0 | Depending on the Solef 5130 content in solution and showing the best attachment among PVDF solutions |
| Solef 5130/ PAI | 5 (4 w.t. % Solef 5130 and 1 w.t. % PAI) & 5 (3 w.t. % Solef 5130 and 2 w.t. % PAI) | Depending on the ratio between Solef 5130 and PAI content in solution but relatively weak attachment, showing good performance with Solef 5130/ PAI (3/2) |

Figure 21:
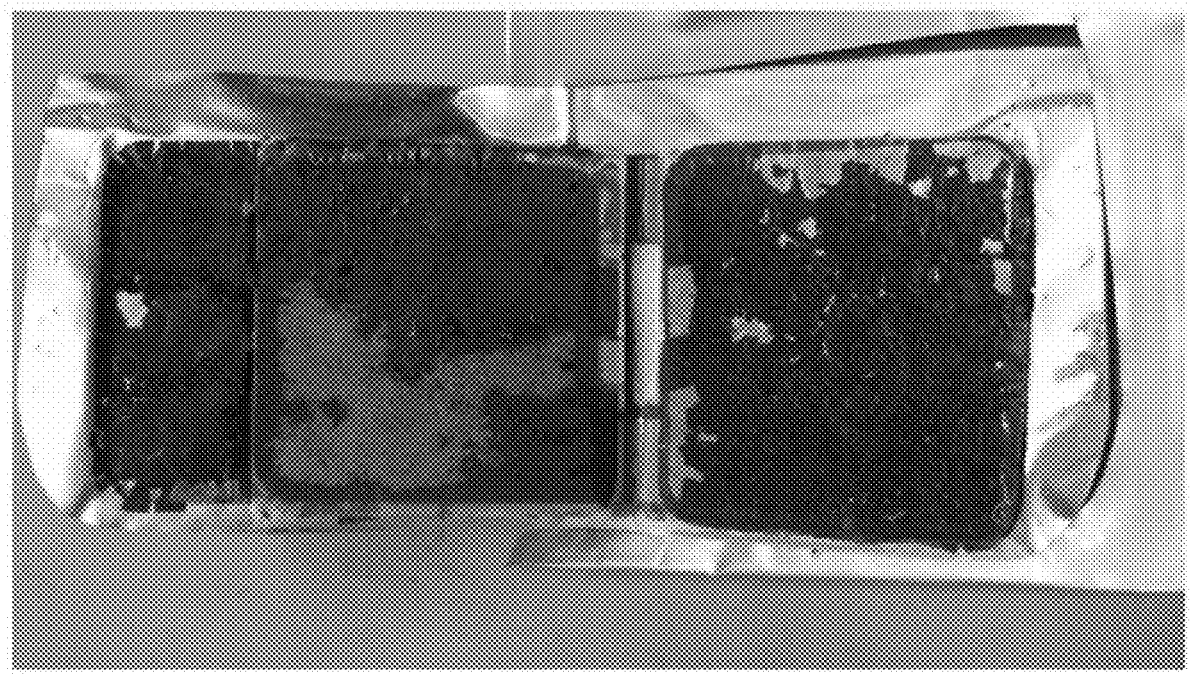
FIG. 21 is a photograph of a composite film with an electrode attachment substance of polyvinylidene fluoride (PVDF)
Figure 22:
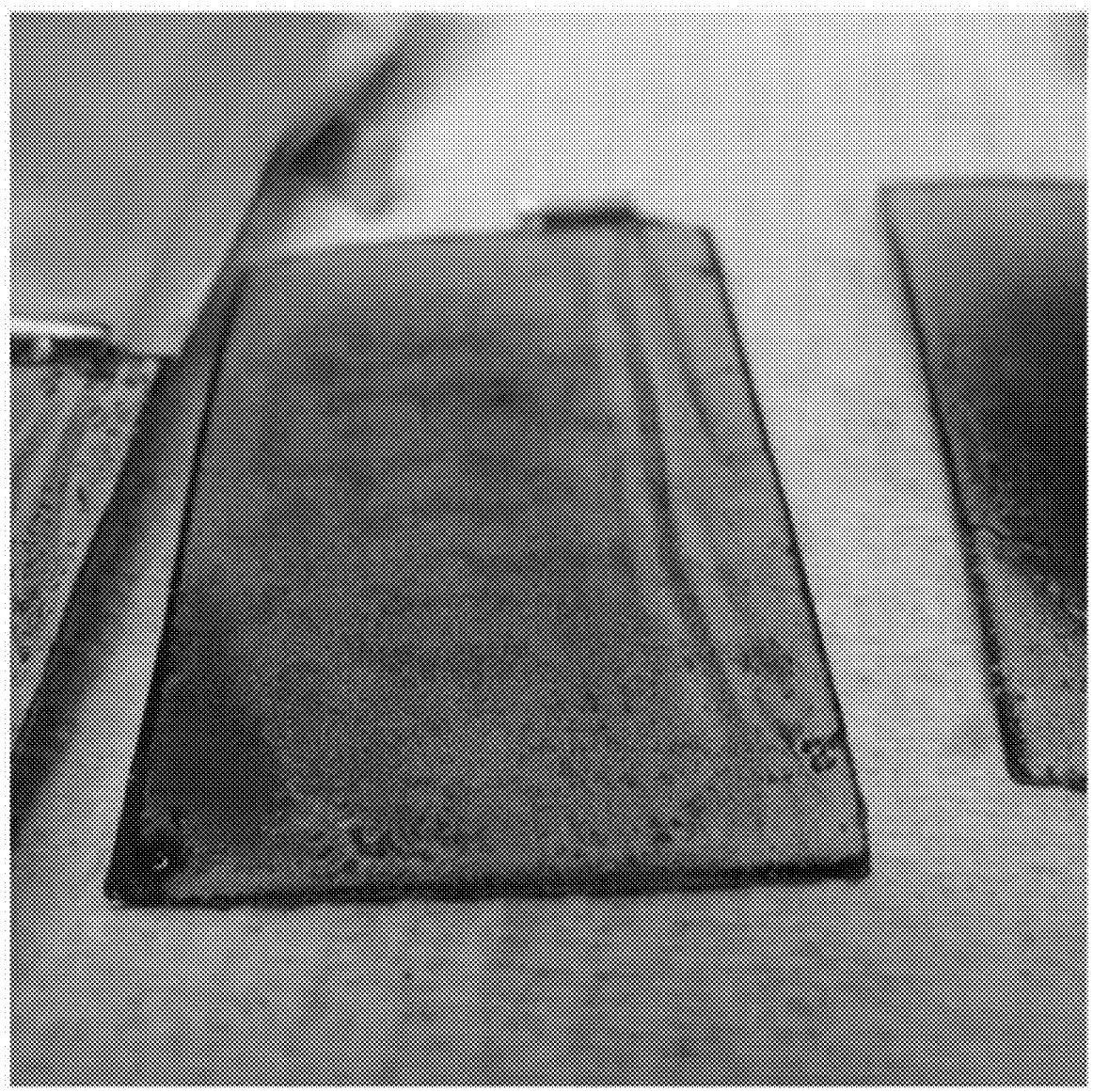
FIG. 22 is a photograph of a composite film with an electrode attachment substance of polyamideimide (PAI)

FIG. 21 is a photograph of an anode with Solef 5130 (e.g., PVDF) after being cycled. Although this anode adhered to the current collector better than without an attachment substance, a substantial portion of the film with the electrochemically active material disintegrated with cycling. When using solution with low PVDF content, there were no large difference in attachment according to kind of PVDF and its content In contrast to PVDF, the PAI attachment substance provided robust adhesion after exposure to electrolyte. FIG. 22 is a photograph of an anode with a PAI attachment substance after being exposed to electrolyte.

Figure 23:
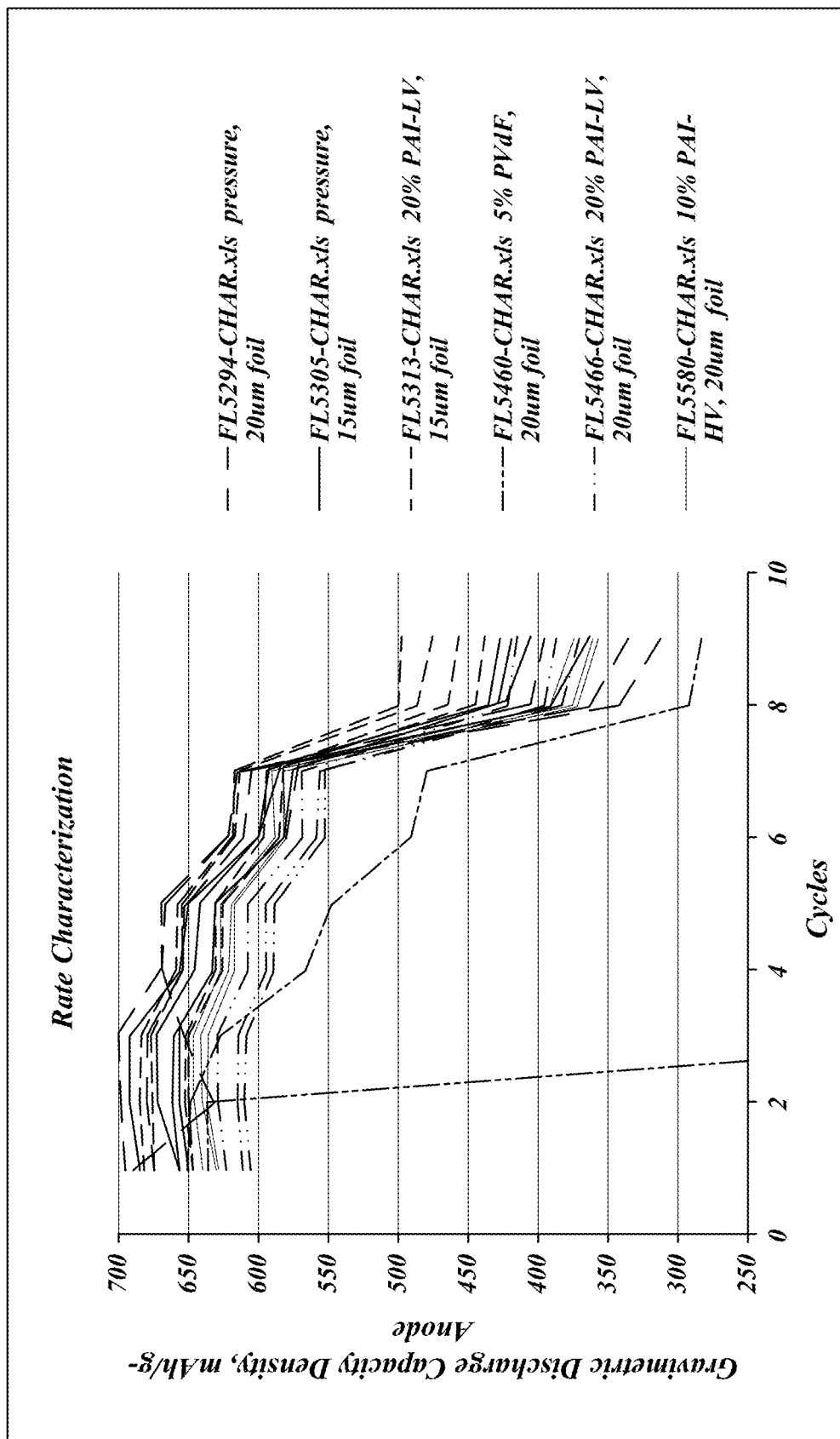
FIG. 23 is a plot of gravimetric discharge capacity density as a function of cycles for samples with different electrode attachment substances and without an electrode attachment substance.

To ensure that PAI did not adversely affect the electrochemical performance of the cells, cells were built with PAI, PVDF, and pressure, and subjected to rate characterization tests and long-term cycling at different rates. FIG. 23 is a plot of discharge rate as a function of cycles. The rate characterization test showed considerable variation within each group, but demonstrated that PAI-attached cells have similar rate capability compared to pressure cells, as shown in FIG. 23. Too many of the PVDF cells in this group failed, so meaningful conclusions were not made regarding the difference between the electrochemical performance of PAI and PVDF.

Figure 24:
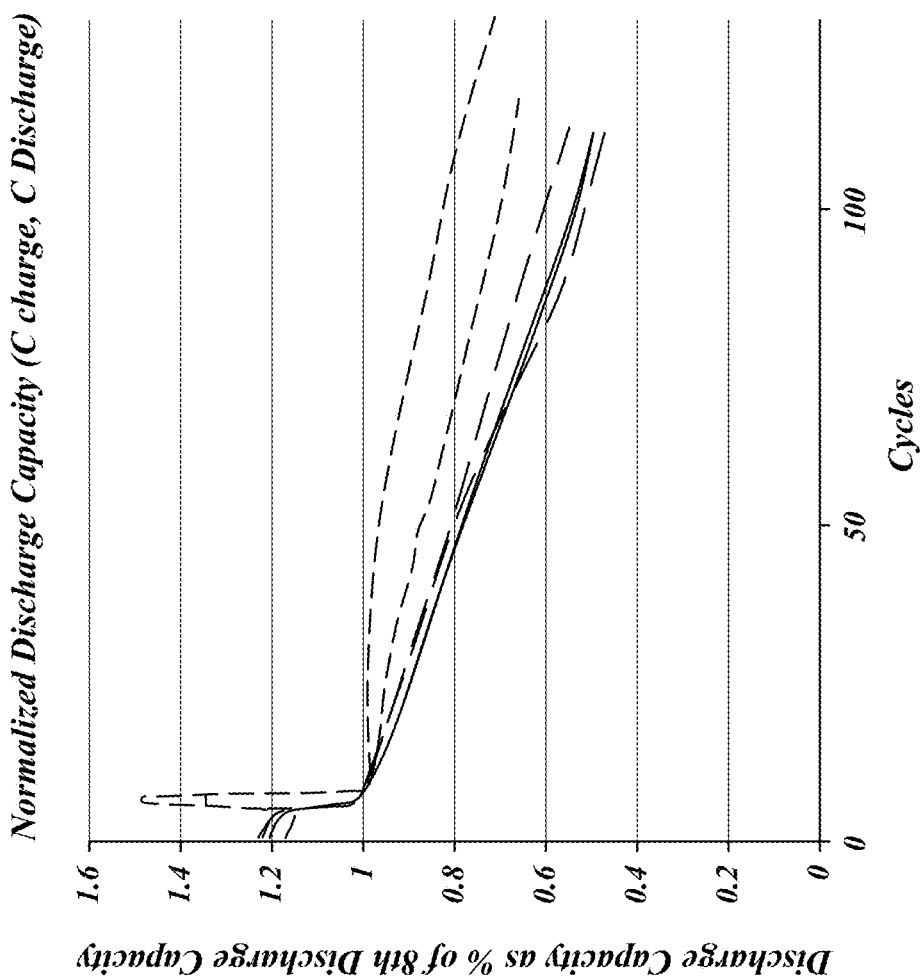
FIG. 24 is a plot of discharge capacity as percentage of 8th discharge capacity as a function of cycles for samples with an electrode attachment substance of PAI and without an electrode attachment substance at an average charge rate of C and average discharge rate of C.
Figure 25:
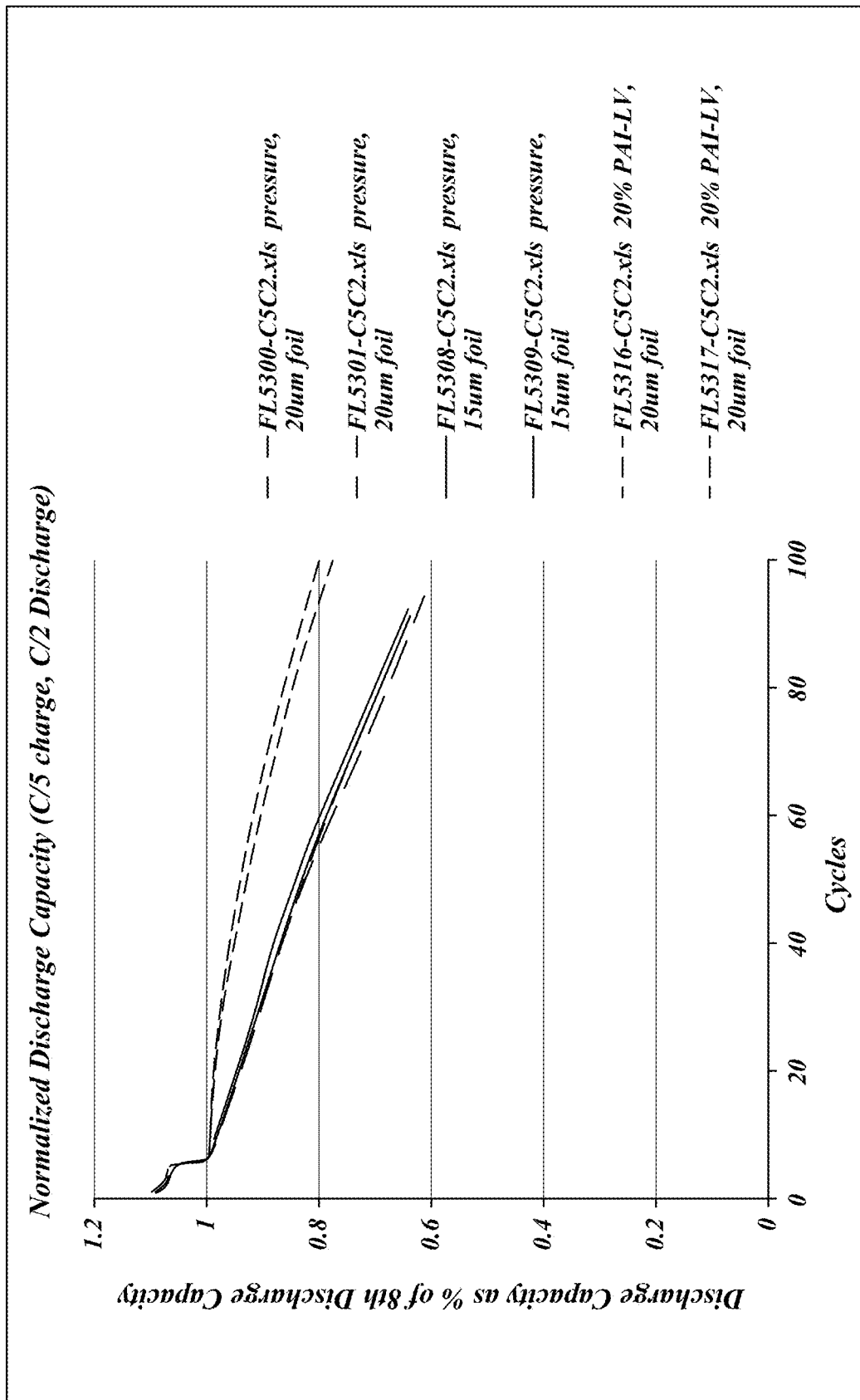
FIG. 25 is a plot of discharge capacity as percentage of 8th discharge capacity as a function of cycles for samples with an electrode attachment substance of PAI and without an electrode attachment substance at an average charge rate of C/5 and average discharge rate of C/2.
Figure 26:
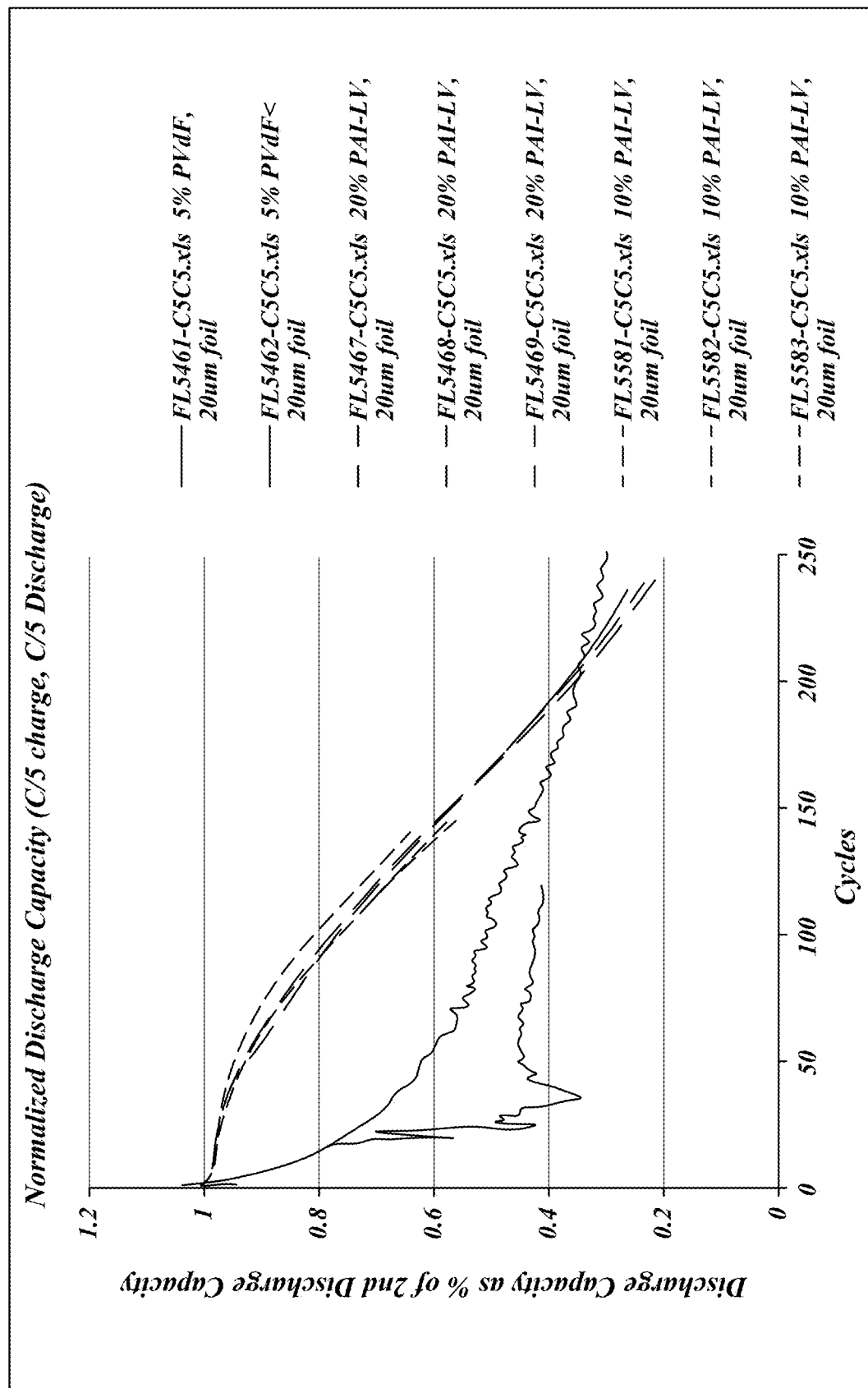
FIG. 26 is a plot of discharge capacity as percentage of 2nd discharge capacity as a function of cycles for samples with an electrode attachment substance of PAI and samples with an electrode attachment substance of PVDF at an average charge rate of C/5 and average discharge rate of C/5.

FIGS. 24 and 25 are plots of the discharge capacity as percentage of 8th discharge capacity as a function of cycles, and FIG. 26 is a plot of discharge capacity as percentage of 2nd discharge capacity as a function of cycles. The long term cycling tests showed PAI cells outperforming pressure cells, particularly at low rates, as shown in FIGS. 24 and 25. The tests also showed little difference between different types of PAI, and a large improvement over PVDF, as shown in FIG. 26. In summary, PAI-attached anodes are less disintegrated and have better cycling performance than anodes attached with any other method tested. A different approach with PVDF could lead to better results with PVDF-attached anodes.

Attaching a film with an electrochemically active material to the current collector can also be performed by the following example method. The example illustrates an example silicon composite electrode for lithium-ion batteries. The example includes two pieces of silicon composite material bonded to a current collector using a thermoplastic polymer in a substantially solid state as an attachment substance. In general, the example electrode can be produced by coating each side of a current collector foil with a thermoplastic polymer. A heat lamination process can be used to fix the silicon composite material to each side of the current collector foil.

Copper Coating

The example method can include providing a piece of copper foil (e.g., about 40 cm×about 20 cm piece of copper foil with a thickness of about 8 μm). The copper foil can be from Fukuda Metal Foil & Powder Co., Ltd. The copper foil can be fixed to a flat glass surface with a few drops of ethyl acetate (e.g., supplied by Sigma Aldrich). Aluminum foil (e.g., two approximately 45 cm long strips of 25 μm thick aluminum foil and about 1.5 cm in width) can be used to mask the long edges of the copper foil. For example, the aluminum foil can be fixed to the copper foil surface with ethyl acetate. The copper foil surface can be cleaned, e.g., with a few drops of NMP and lint-free wipes. A solution with the attachment substance can be applied to the copper foil. For example, about 8 mL of about 5 wt % PVDF in NMP solution can be dispensed at the top part of the copper foil. Other solutions, e.g., PAI solution, as described herein can also be used. A caster with a gap of about 6 mil from the glass can be used to form a uniform coating of the solution over the copper foil.

The wet coated copper foil can be dried a well-ventilated convention oven (e.g., for about one hour at about 80° C. The dry coated copper foil can be removed from the oven. If the attachment substance is to be provided on both sides of the current collector, the dry coated copper foil can be placed on a glass with the coated side down. The copper foil can be fixed to the glass with a piece of tape. The coating process can be repeated for the second side. For example, aluminum foil (e.g., two approximately 45 cm long strips of 25 μm thick aluminum foil and about 1.5 cm in width) can be used to mask the long edges of the copper foil. The aluminum foil can be fixed to the copper foil surface with ethyl acetate. The copper foil surface can be cleaned, e.g., with a few drops of NMP and lint-free wipes. A solution with the attachment substance can be applied to the copper foil. The same or different solution than that used for the first side can be used. For example, about 8 mL of about 5 wt % PVDF in NMP solution can be dispensed at the top part of the copper foil. Other solutions, e.g., PAI solution, as described herein can also be used. A caster with a gap of about 6 mil from the glass can be used to form a uniform coating of the solution over the copper foil.

The wet coated copper foil can be dried in a convection oven (e.g., for about one hour at about 80° C. The dry double side coated copper foil can be removed from the oven. The coated copper foil can be trimmed (e.g., into about 20 cm×about 19 cm sheets). The sheets can be stacked, e.g., separated by lint-free wipes, on a drying rack and dried under vacuum, e.g., at about 100° C. for about 7 hours. The vacuum-dried sheets can be removed from the vacuum oven and trimmed (e.g., about 4 cm×about 10 cm pieces, leaving about a 4 cm×about 1.5 cm uncoated region on each piece).

Heat Lamination

Figure 27A:
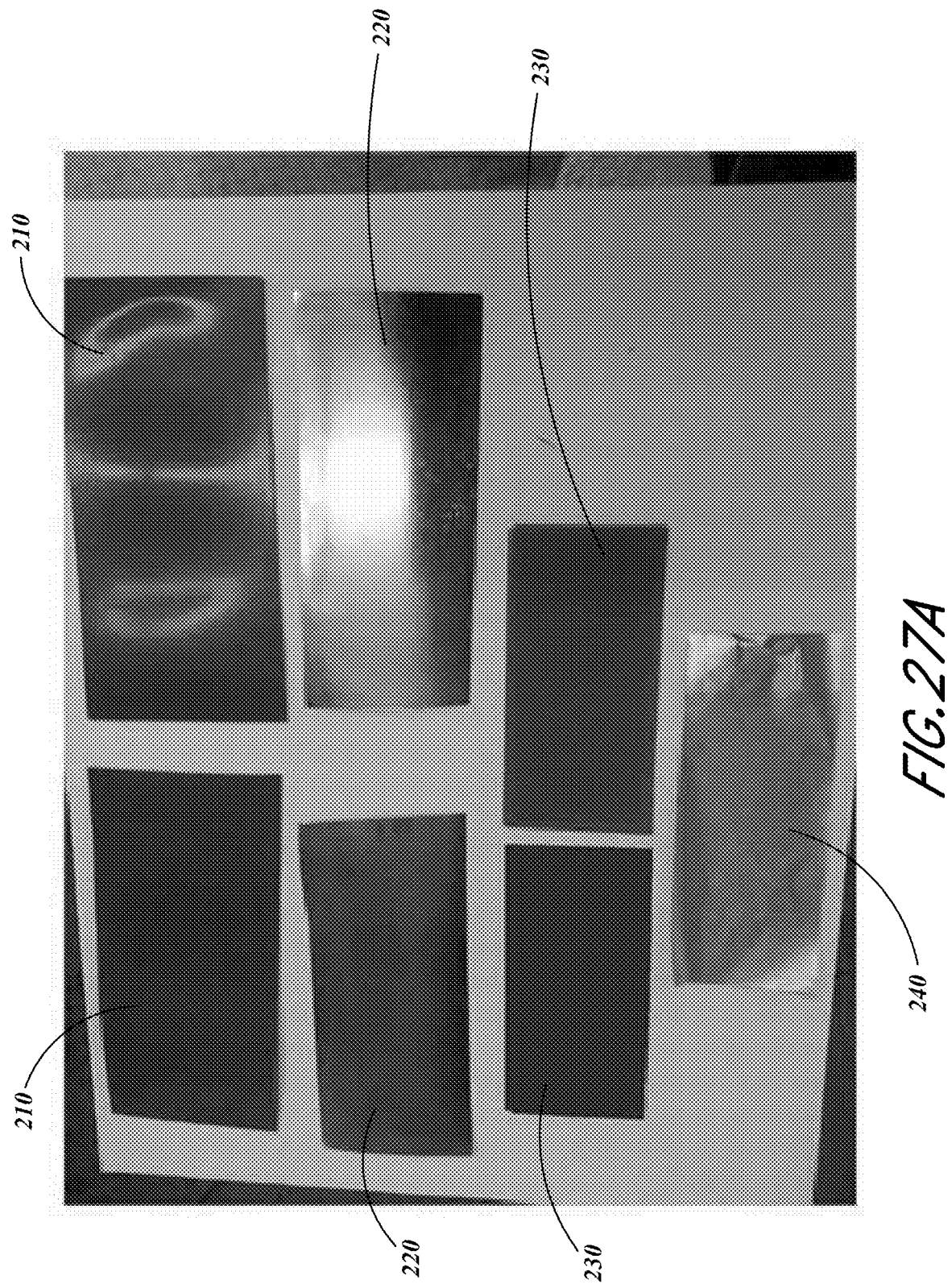
FIGS. 27A-D are illustrations of an example method of assembling an electrode stack for heat lamination.
Figure 27B:
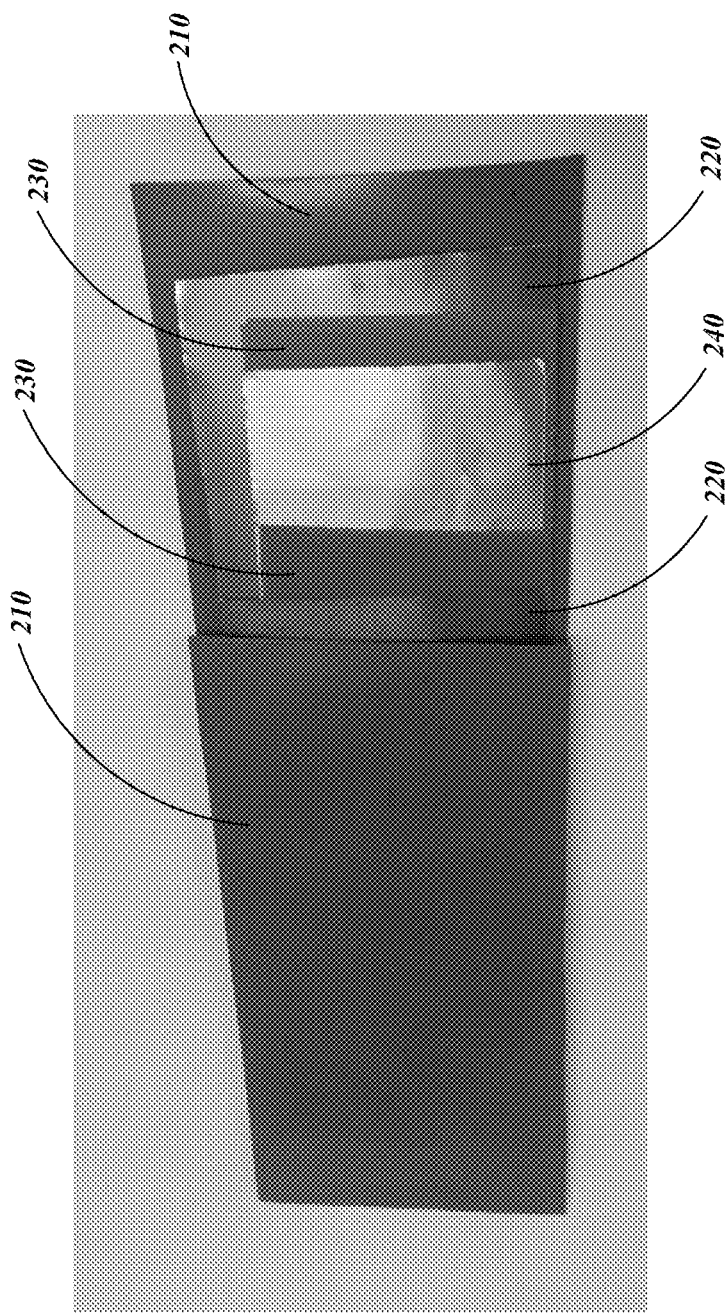
Figure 27C:
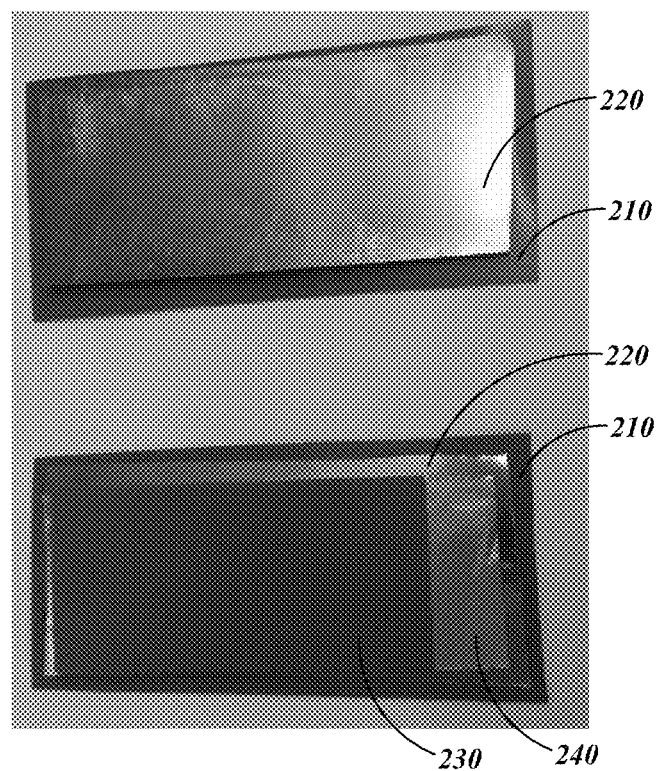

The example method of attaching a film with an electrochemically active material to the current collector can further include setting a roll press machine to a desired temperature (e.g., about 230° C.) and allowing the temperature to stabilize. The method can further include setting the gap between the rolls (e.g., to about 1.6 mm) and the roll speed (e.g., to about 0.26 cm/s). The method can include providing rubber pieces (e.g., about 5 cm×about 11 cm silicone rubber with a thickness of about 1/32 inch and a durometer scale of 90 A) and shim stock (e.g., about 5 cm×about 11 cm with a thickness of about 3 mil). FIGS. 27A-D are illustrations of an example method of assembling the electrode stack for heat lamination. For example, FIG. 27A illustrates example materials for the electrode assembly including two pieces of silicone rubber sheets 210, two pieces of steel shim stock 220, two pieces of silicon composite material 230, and a double side coated copper foil 240 (e.g., as described herein). FIG. 27B illustrates an example assembled lamination stack with an offset to show stack order. For example, the double side coated copper foil 240 can be sandwiched by the two pieces of silicon composite material 230. The two pieces of steel shim stock 220 can sandwich the two pieces of silicon composite material 230. The two pieces of silicone rubber sheets 210 can sandwich the two pieces of steel shim stock 220. Thus, the final stack order in this example is silicone rubber sheet 210/steel shim stock 220/silicon composite material 230/coated copper foil 240/silicon composite material 230/steel shim stock 220/silicone rubber sheet 210. FIG. 27C illustrates the relative position of the silicon composite material 230 and the coated copper foil 240 in the example assembled lamination stack. For example, one set of the silicone rubber sheet 210 and steel shim stock 220 has been separated from the assembly to reveal the silicon composite material 230 and the coated copper foil 240.

Figure 27D:
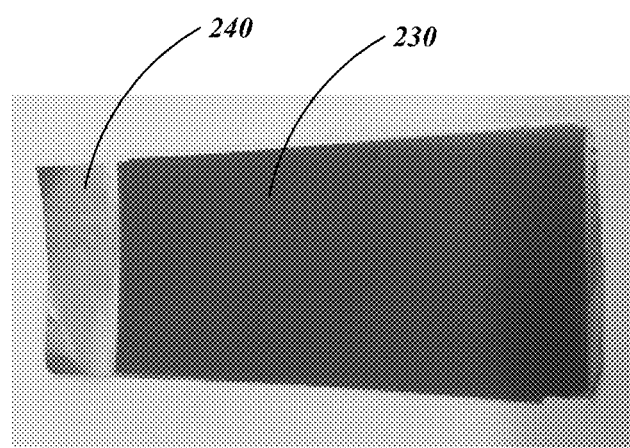

The example method of attaching a film with an electrochemically active material to the current collector can further include feeding the assembled stack into the roll press machine. The uncoated copper region of the copper foil 240 can be placed at the leading edge. The stack can be allowed to cool. The electrode assembly can be separated from the two pieces of steel shim stock 220 and two pieces of silicone rubber sheets 210 and inspected. FIG. 27D illustrates an example finished electrode assembly.

Figure 28:
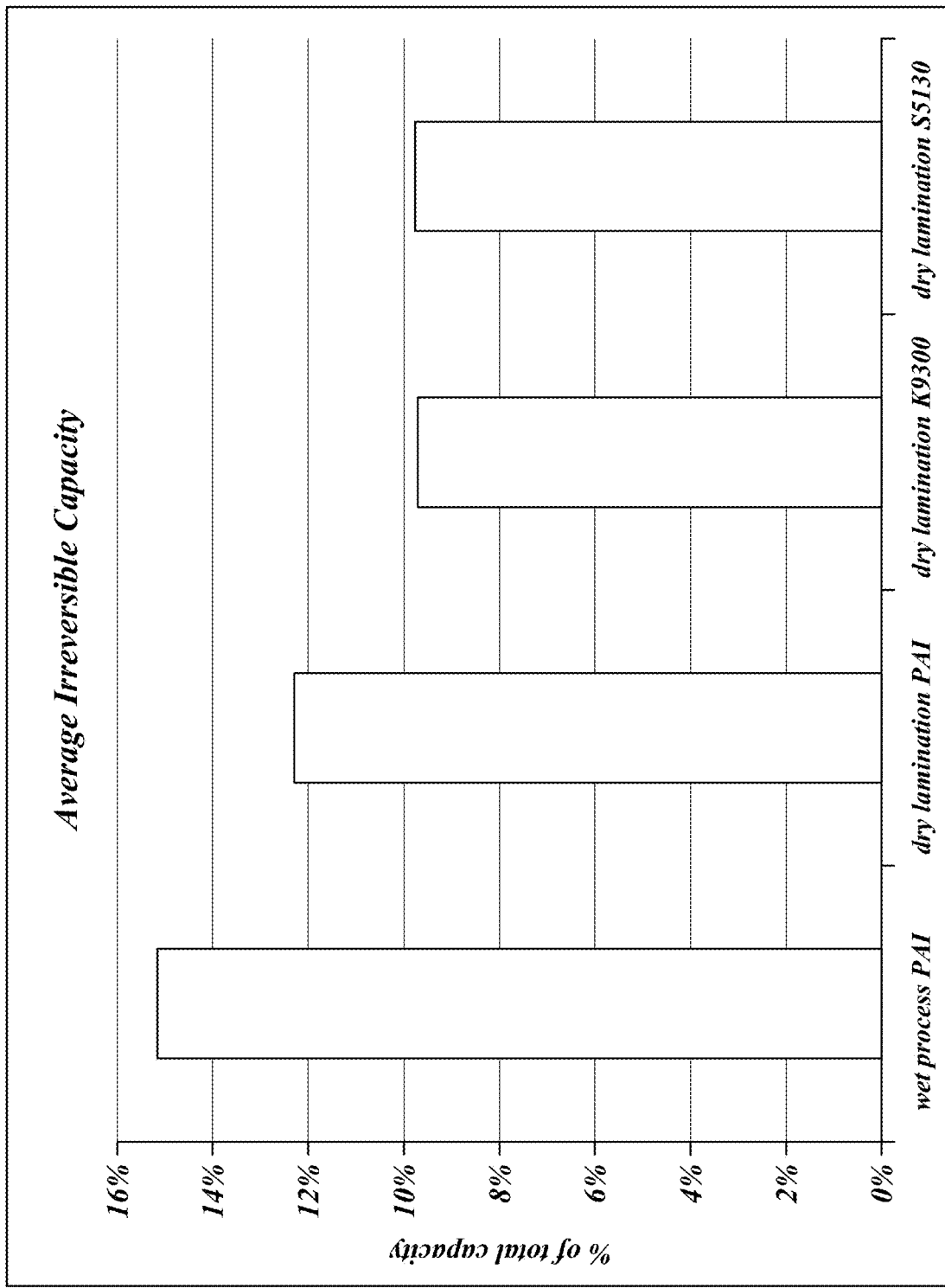
FIG. 28 is a bar graph comparing the average irreversible capacity for electrode assemblies formed by different methods of attaching composite films to the current collector.

In certain embodiments of attaching a film with an electrochemically active material to a current collector with a lamination process (e.g., a substantially dry process) when compared to certain embodiments with a solution/wet process, the first-charge irreversible capacity can be reduced. As a result, in such embodiments, the volumetric energy density can be increased. Table IIA lists the average irreversible capacity for sample electrode assemblies formed by different methods of attaching composite films to the current collector. FIG. 28 shows a bar graph displaying the results of Table IIA. For example, in certain embodiments of attaching a film with an electrochemically active material to a current collector with a lamination process (e.g., dry lamination) when compared to certain embodiments with a solution process (e.g., wet process), the first-charge irreversible capacity can be reduced from about 15% to about 10%. In subsequent cell test results, a difference as high as 9% was measured between wet process PAI and dry lamination K9300.

TABLE IIA

| Product Description | average irreversible capacity | average first discharge capacity (Ah) | average first charge capacity (Ah) |
|---|---|---|---|
| wet process PAI | 15.22% | 0.102 | 0.120 |
| dry lamination PAI | 12.32% | 0.108 | 0.123 |
| dry lamination K9300 | 9.81% | 0.108 | 0.119 |
| dry lamination S5130 | 9.84% | 0.108 | 0.120 |

Additional methods of application of an electrode attachment substance were tested. Table IIB lists methods of forming an electrode with an electrode attachment substance along with the results. For example, certain embodiments of the method can include wet lamination ("conventional"), wet lamination followed by roll pressing at room temperature ("conventional & cold pressing"), wet lamination followed by roll pressing at 130° C. ("conventional & hot pressing"), and/or dry lamination ("dry type attachment"). In some embodiments, dry lamination can also be followed by cold or hot pressing.

TABLE IIB

| Method type | Method details | Result |
|---|---|---|
| Conventional | Casting on the glass plate with doctor blade using proper solution. Getting wet one side of Cu foil on the cast solution. Putting anode on the wet side. Drying at oven for 1 hour. Drying at vacuum oven for 1 hour. | Partial and weak attachment depending on the PVDF content in solution |
| Conventional & cold pressing | Preparing Cu foil and anode attachment using conventional method. Cold calendering anode-attached Cu foil sandwiched between two polypropylene (PP) plate using roll press at room temperature. | Better attachment than conventional method |
| Conventional & hot pressing | Preparing Cu foil and anode attachment using conventional method. Cold calendering anode-attached Cu foil sandwiched between two PP plate using roll press at temperature at 130° C. | Better attachment than conventional method and/or conventional & cold pressing |
| Dry type attachment | Dipping Cu foil into proper PVDF solution. Drying at room temperature. Hot calendering anode-attached Cu foil sandwiched between two Kapton films using roll press at temperature at 130° C. | Better attachment than conventional method and/or conventional & cold pressing |

Using PAI (polyamideimide) to attach films with electrochemically active material (e.g., composite films) to copper foils (e.g., current collector) to form electrodes (e.g., anode or cathode) has been shown to prevent delamination of the electrode film from the copper foil. The electrode films typically will exhibit some volume expansion in the x-y direction (e.g., the plane of the film rather than the thickness direction of the film) when lithiated (e.g., charged). The dimension expansion in plane of silicon composite-based electrode films may be reduced to essentially zero (e.g., about zero) to about 10% when attachment using PAI is used. In addition to the reduction in x-y expansion (e.g., in plane expansion), the electrodes (e.g., the assembly of the film with electrochemically active material attached to the copper foil) show essentially no failure or at least no significant failure. For example, failure can include delamination between the film and the copper foil and/or breakage of the current collector. Therefore, the electrode attachment substance may allow for expansion of the anode active material and current collector without significant breakage of the current collector and without significant delamination of the film from the current collector. In cases where an inferior adhesion layer is used, the film can be peeled off the copper foil after disassembly of a cell that has been charged. In the case of PAI, the electrode assembly remains intact. Without being bound by theory, it is believed that the PAI attachment is superior to other approaches because of the affinity (e.g., better adhesion) of PAI to the film and the copper foil. PAI has been used in lithium-ion batteries for other applications such as a polymeric binder of a silicon particulate electrode as described by N. Choi et al., "Enhanced electrochemical properties of a Si-based anode using an electrochemically active polyamide imide binder," Journal of Power Sources 177 (2008) 590-594. In addition to the physical attachment enhancement, cells built with PAI-attached electrode assemblies have shown better testing results compared to cells with silicon-containing self-supported electrode films adhered to the current collector using a different polymer such as PVDF.

Initial cell discharge rate capability tests show a higher rate capability compared to cells made with different attachment methods. Table III includes data for the PAI-attached anode assembly cells. Direct control cells made using anode active material films attached to copper with PVDF had a 2 C discharge capacity of about 45%.

TABLE III

| Type of Attachment Used | C/5 Discharge Capacity | C/2 Discharge Capacity | C Discharge Capacity | 2C Discharge Capacity |
|---|---|---|---|---|
| 20% PAI in NMP | 100% | 96.41% | 90.36% | 70.12% |
| 15% PAI in NMP | 100% | 96.18% | 89.39% | 58.36% |
| 20% PAI in DMAc | 100% | 96.19% | 88.62% | 61.86% |
| 15% PAI in DMAc | 100% | 95.96% | 88.69% | 53.83% |

In addition to discharge capacity, testing has shown an enhancement of up to three times in cycle life in some cases for the cycle life of cells built with electrode assemblies attached with PAI versus PVDF. The PVDF-attached electrode assemblies were superior in performance than the other materials that had been tested other than PAI.

As can be seen in the photograph of FIG. 22, the anode active material film is attached well to the current collector without any expansion after cycling and disassembly. In addition, carboxymethyl cellulose (CMC) can be used as an electrode attachment substance that may yield similar results. Other examples of possible attachment substances include polyimide, epoxy, conductive glue, Na-CMC, PAI, etc. Furthermore, treating the copper foil surface (e.g. roughening, plasma treatment) may further improve adhesion of the film to the copper foil. Describe above are various attachment substances and methods of attaching the film to the copper foil. Each of the attachment substances and methods can be used in various combinations.

Electrochemical Cell (Cell Attachment Substance to Adhere Together an Electrode and a Separator)

Attaching an electrode to a separator can be performed by the following example methods. A separator coating solution that includes a solvent and an attachment substance can be prepared. A mixture can be made of NMP (630.4 g) and EtOH (157.6 g) with a ratio of 80:20 (other possible ratios are 90:10 to 70:30). PVDF polymer (Solef 6020, 12 g) is added to the mixture to form a solution. The solution can be mixed at room temperature for about 1 hour with magnetic stirrer and then heated to about 150° C. and mixed until solution is transparent (about 30 mins). A separator can be cut to size and held in a fixture during the dipping/coating process. The separator can be any type of polyolefin separator such as Celgard 2500 and EZ1592. The separator is dipped into the PVDF solution bath and removed. Excess PVDF solution can be removed, and the separator can be dipped into a water bath for 5 minutes. The separator can then be dried for about 4 hours at room temperature and then dried in a vacuum oven at 60° C. for about 6 hours (about 30 in Hg).

The anode dipping solution that includes a solvent and an attachment substance can be prepared. A mixture can be made of acetone (506.3 g), NMP (17.5 g) and EtOH (58.2 g) with a ratio of 87:3:10 (other possible ratios are 85-87:0-3:10). PVDF polymer (Solef 6020, 18 g) is added to the mixture to form a solution. The solution can be mixed at room temperature for about 1 hour with magnetic stirrer and then heated to about 220° C. and mixed until solution is transparent (about 30 mins). An anode can be held in a fixture during the dipping/coating process. The anode is dipped into the PVDF solution bath and removed. Excess PVDF solution can be removed. The anode can then be dried in a vacuum oven at 110° C. for about 1 hour.

The cell (e.g., pouch cell) can then be assembled using the separator and anode. The cell can be hot pressed at about 110° C. for about 1 min for a cell with a thickness of about 1.8 mm and about 2 min for a cell with a thickness of about 4.5 mm. After hot pressing, the cell is moved immediately to a cold press at room temperature for a similar time as used with the hot press. A spacer can be used to adjust the gap in the top and bottom plates of the press to avoid crushing the cell. The pressing consolidates the PVDF coating on the separator and the PVDF coating on the anode.

Figure 29:
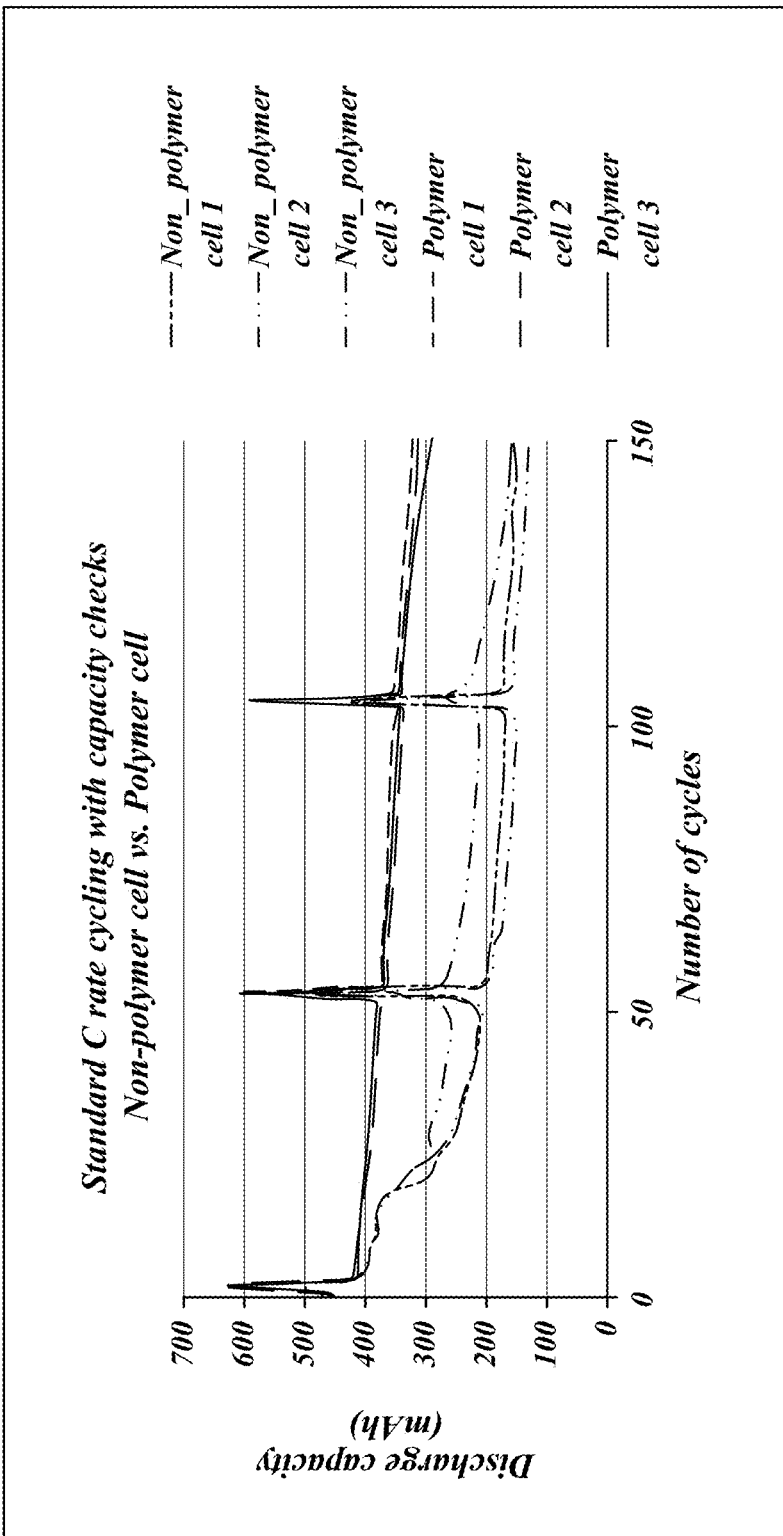
FIG. 29 is a plot of discharge capacity as a function of number of cycles for cells with a cell attachment substance and cells without a cell attachment substance.
Figure 30:
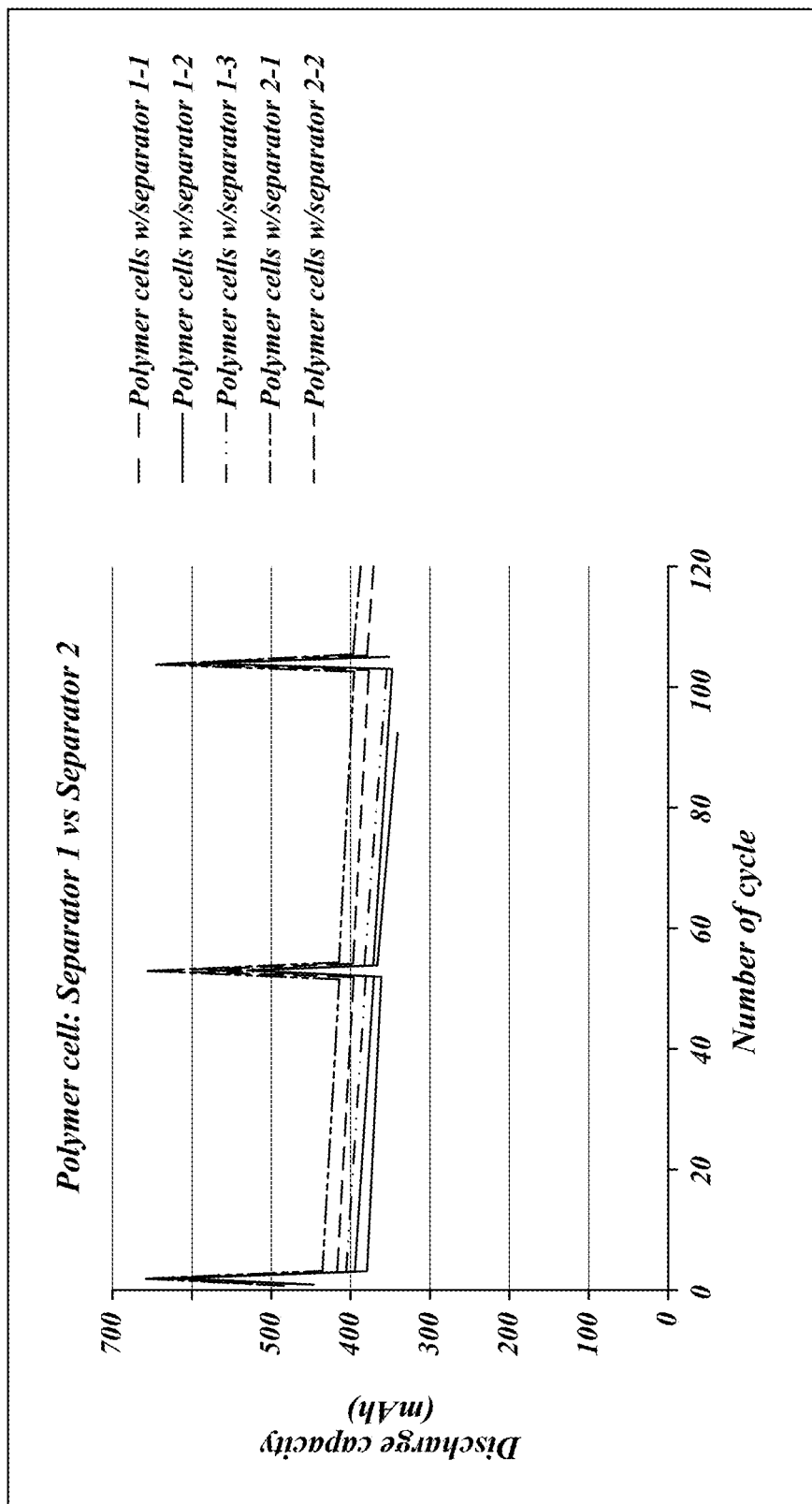
FIG. 30 is a plot of discharge capacity as a function of number of cycles for cells with a cell attachment substance comparing samples with different separator materials.
Figure 31:
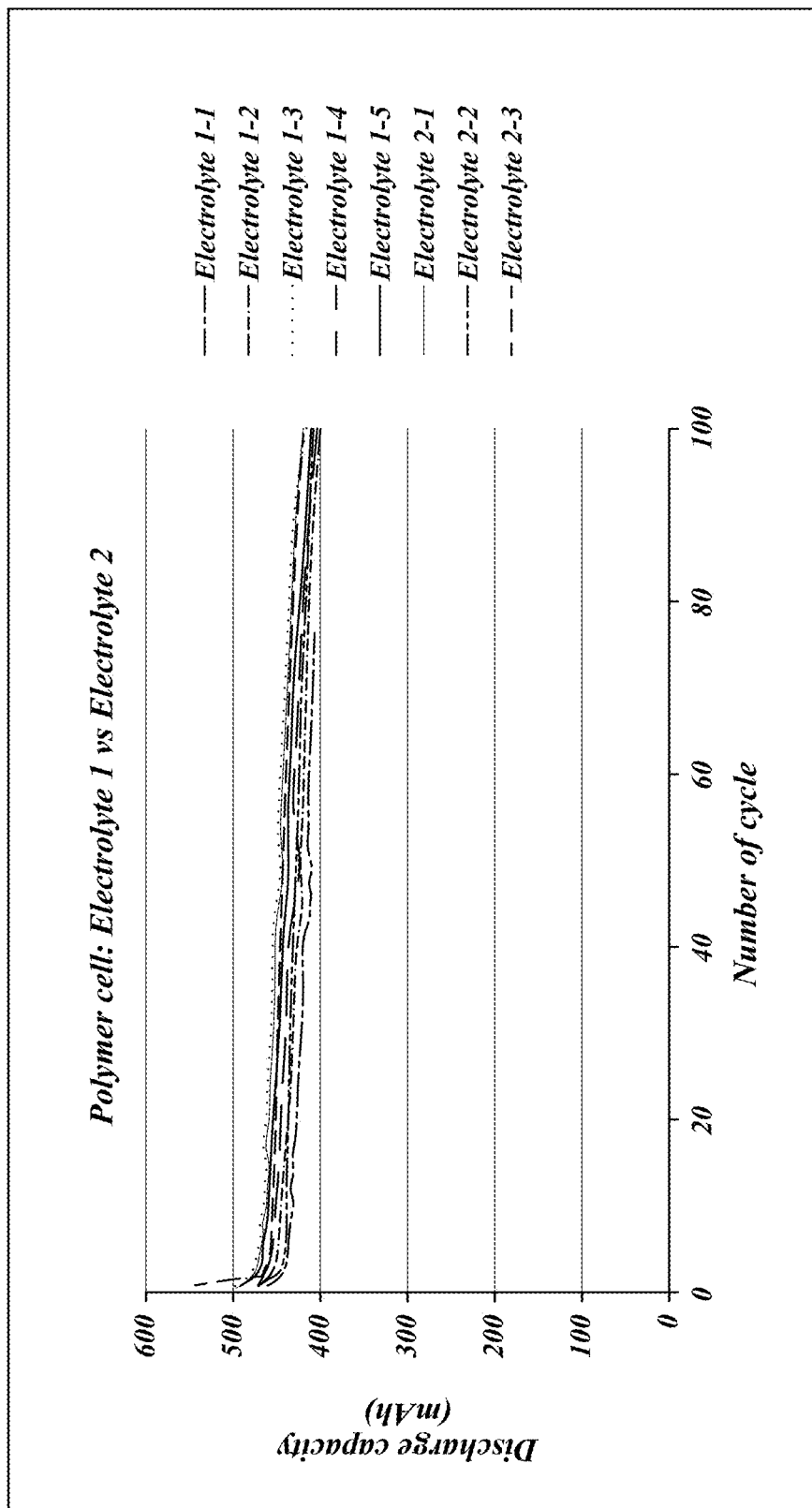
FIG. 31 is a plot of discharge capacity as a function of number of cycles for cells with a cell attachment substance comparing samples with different electrolytes.

Various cell performance comparisons were made between a polymer cell (e.g., PVDF coatings) and non-polymer cells (e.g., no attachment substance). All the cells used similar anodes. The cells were kept in aluminum clamps and then unclamped. FIG. 29 is a plot of discharge capacity as a function of cycles. The polymer cells showed no significant degradation while the non-polymer cells showed immediate degradation. FIG. 30 is a plot of discharge capacity as a function of cycles for two different separators. Separator 1 is Celgard 2500 and Separator 2 is Celgard EZ1592. The cycle performance did not vary much between the two separator types. FIG. 31 is a plot of discharge capacity as a function of cycles for two different electrolyte solutions. Electrolyte 1 is a EC:DEC:DMC (1:1:1) based electrolyte and Electrolyte 2 is a EC:EMC (3:7) based electrolyte. The cycle performance did not vary much between the two electrolytes.

Additional solutions of polymers and solvents were tested. Table IV lists various solutions and results.

TABLE IV

| Type of polymer content and solution composition | Solution Stability | Method | Results |
|---|---|---|---|
| 6 w.t. % HSV-900 in Ac/EtOH (90/10) | Low | Two heavy dryers for 1 min 10 sec | Too thick coating layer<br>Broad distribution of coating layer<br>Wrinkles and uneven parts in bottom<br>Partial peel-off properties between separator and coating layer<br>Bad performance during fast characterization |
| 6 w.t. % Kynar 760 in Ac/EtOH(90/10) | Low | Two heavy dryers for 1 min 10 sec | Too thick coating layer<br>Broad distribution of coating layer<br>Wrinkles and uneven parts in bottom<br>Peel-off properties between separator and coating layer<br>Bad performance during fast characterization |
| 6 w.t. % K301-F in Ac/EtOH(90/10) | Low | Two heavy dryers for 1 min 10 sec | Too thick coating layer<br>Broad distribution of coating layer<br>Wrinkles and uneven parts in bottom<br>Bad performance during fast characterization |
| 4 w.t. % HSV-900 in Ac/EtOH (90/10) | Low | Two heavy dryers for 1 in 10 sec | Relatively thick coating layer<br>Broad distribution of coating layer<br>Wrinkles and uneven parts in bottom<br>Peel-off properties between separator and coating layer<br>Bad performance during fast characterization |
| 4 w.t. % K301-F in Ac/EtOH(90/10) | Low | Two heavy dryers for 1 min 10 sec | Relatively thick coating layer<br>Broad distribution of coating layer<br>Wrinkles and uneven parts in bottom |
| 3 w.t. % HSV-900 in Ac/EtOH (90/10) | Low | Two heavy dryers for 1 min 10 sec | Relatively thick coating layer<br>Broad distribution of coating layer<br>Wrinkles and uneven parts in bottom<br>Bad performance during fast characterization |
| 3 w.t. % K301-F in Ac/EtOH(90/10) | Low | Two heavy dryers for 1 min 10 sec | Relatively thick coating layer<br>Broad distribution of coating layer<br>Wrinkles and uneven parts in bottom<br>Bad performance during fast characterization |
| 2 w.t. % HSV-900 in Ac/EtOH (90/10) | Low | Two heavy dryers for 1 min 10 sec | Too thin coating layers<br>Broad distribution of coating layer<br>Wrinkles and uneven parts in bottom<br>Bad performance during fast characterization |
| 2 w.t. % K301-F in Ac/EtOH(90/10) | Low | Two heavy dryers for 1 min 10 sec | Too thin coating layer<br>Broad distribution of coating layer<br>Wrinkles and uneven parts in bottom<br>Bad performance during fast characterization |
| 4 w.t. % Solef 6020 in Ac/EtOH(90/10) | Low | 1st generation air blade for cold drying (10 sec) and heavy dryer for hot drying (1 min) | Good coating layer but still show broad distribution of coating layer<br>Wrinkles and uneven parts in bottom<br>Better than Heavy dryer only system<br>Moderate performance during fast characterization |
| 5 w.t. % Solef 6020 in Ac/EtOH(90/10) | Low | 1st generation air blade for cold drying (10 sec) and heavy dryer for hot drying (1 min) | Good coating layer but still show broad distribution of coating layer<br>Wrinkles and uneven parts in bottom<br>Better than Heavy dryer only system<br>Moderate performance during fast characterization |
| 3 wt. % Solef 5130 in Ac/EtOH(80/20) | Low | 2nd generation air blade for cold drying (10 sec) and heavy dryer for hot drying (1 min) | Moderate coating layer but easy to peel-off property<br>Wrinkles and uneven parts in bottom<br>Better than 1st generation air blade system<br>Moderate performance during fast characterization |

TABLE IV-continued

| Type of polymer content and solution composition | Solution Stability | Method | Results |
|---|---|---|---|
| 3 wt. % Solef 6020 in Ac/NMP/EtOH (88/2/10) | Moderate | 2nd generation air blade for cold drying (10 sec) and heavy dryer for hot drying (1 min) | Moderate coating layer but easy to peel-off property Wrinkles and uneven parts in bottom Better than 1st generation air blade system Moderate performance during fast characterization |
| 3 wt. % Solef 6020 in Ac/NMP/EtOH (87/3/10) | Good | 2nd generation air blade for cold drying (10 sec) and heavy dryer for hot drying (1 min) | Good coating layer Still having wrinkles and uneven parts in bottom Better than 1st generation air blade system Moderate performance during fast characterization |
| 3 wt. % Solef 6020/Solef 5130 (75/25) in Ac/EtOH (9/1) | Low | 2nd generation air blade for cold drying (10 sec) and heavy dryer for hot drying (1 min) | Good coating layer Still having wrinkles and uneven parts in bottom Better than 1st generation air blade system Moderate performance during fast characterization |
| 3 wt. % Solef 6020/Solef 5130 (75/25) in Ac/NMP/EtOH (88/2/10) | Moderate | 2nd generation air blade for cold drying (10 sec) and heavy dryer for hot drying (1 min) | Good coating layer less wrinkles and uneven parts compared with Ac/EtOH and/or Ac/NMP/EtOH(88/2/10) Better than 1st generation air blade system Moderate performance during fast characterization |
| 2 wt. % Solef 6020/Solef 5130 (75/25) in Ac/NMP/EtOH (88/3/10) | Good | 2nd generation air blade for cold drying (10 sec) and heavy dryer for hot drying (1 min) | Good coating layer but too thin less wrinkles and uneven parts compared with Ac/EtOH and/or Ac/NMP/EtOH(88/2/10) Better than 1st generation air blade system Bad performance during fast characterization |
| 2 wt. % Solef 6020/Solef 5130 (50/50) in Ac/NMP/EtOH (87/3/10) | Good | 2nd generatin air blade for cold drying (10 sec) and heavy dryer for hot drying (1 min) | Good coating layer but too thin less wrinkles and uneven parts compared with Ac/EtOH and/or Ac/NMP/EtOH(88/2/10) Better than 1st generation air blade system Bad performance during fast characterization |
| 2 wt. % Solef 6020/Solef 5130 (25/75) in Ac/NMP/EtOH (87/3/10) | Good | 2nd generation air blade for cold drying (10 sec) and heavy dryer for hot drying (1 min) | Good coating layer but too thin less wrinkles and uneven parts compared with Ac/EtOH and/or Ac/NMP/EtOH(88/2/10) Better than 1st generation air blade system Bad performance during fast characterization |

Various pressures and heat were tested after cell assembly and electrolyte addition. This pressure and heat is what seals the coatings on the anode and separator together. Table V lists various pressing processes and the results.

TABLE V

| Temperature conditions during pressing | Other conditions | Results |
|---|---|---|
| 120 C. for hot press without cold press step | 30 sec for single layer cell 2 min for 15 layer cell | Moderate adhesive property between anode and separator and/or cathode and separator But, bad cell performance |
| 120 C. for hot pressing & cold press with weight | 30 sec for single layer cell 2 min for 15 layer cell | Moderate adhesive property between anode and separator and/or cathode and separator With moderate cell performance |
| Cold pressing | 30 sec for single layer cell | Bad adhesive property between anode and separator and/or cathode and separator And, bad cell performance |

TABLE V-continued

| Temperature conditions during pressing | Other conditions | Results |
|---|---|---|
| Hot pressing & cold pressing with | 30 sec for single layer cell 1 min for 5 layer cell 2 min for 15 layer cell | Good adhesive property between anode and separator and/or cathode and separator without kind of cells With moderate cell performance |
| | 1 min for single layer cell: severe time frame to check damage of separator | Good adhesive property between anode and separator and/or cathode and separator But, bad cell performance |
| | 1 min for 5 layer cell with the highest pressure to check damage of separator | Good adhesive property between anode and separator and/or cathode and separator But, bad cell performance |

A polymer cell was also assembled by attaching electrodes to a polymer-coated separator that had not been fully dried (still has solvents). Attachment between the polymer coated separator and anode-attached Cu foil or cathode was achieved by directly adding anode-attached Cu foil or cathode and adhering the electrode to the surface of a solvated PVDF-coated separator. Good attachment was observed between the separator and anode and/or separator and cathode but poor cell performance was measured. Without being bound by theory, the poor performance was likely due to excess PVDF that filled the pores in the separator and electrode.

Other types of coating methods can be used such as spray, electro-spray, electrospinning, casting with doctor blade, etc. Other types of separators can also be used such as metal oxide-coated or metal oxide filled separator.

Pressure Methods to Prevent Anode Wrinkling in Silicon-Based Anodes

Figure 32:
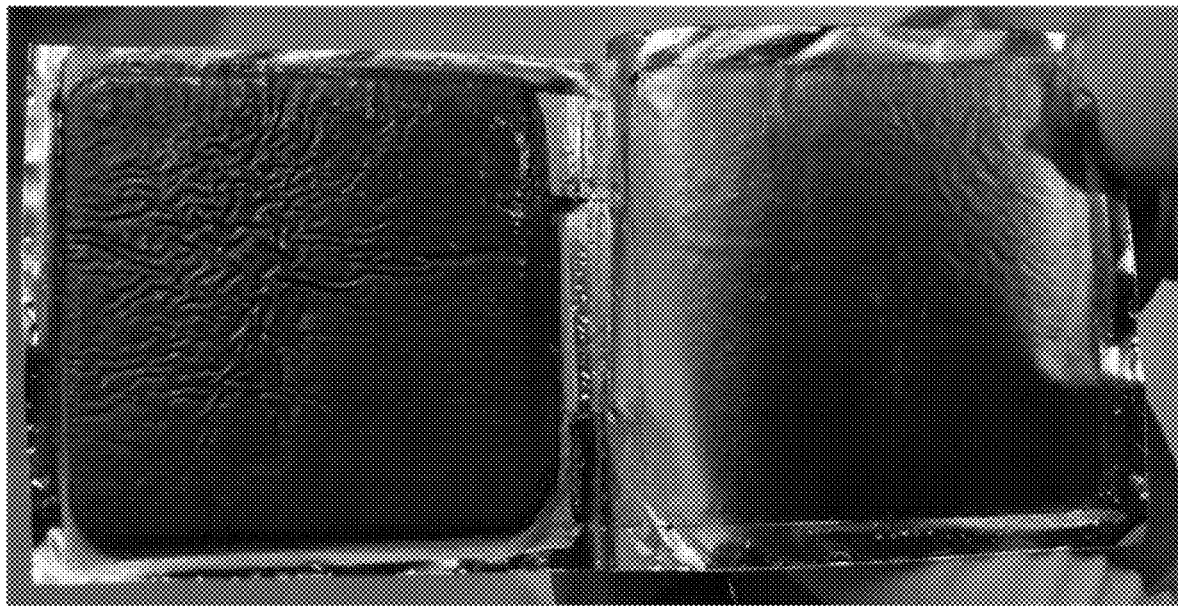
FIG. 32 is a photograph of an electrode showing wrinkling of an anode film.

Upon lithiation, the silicon in the anode swells and expands. Since the material in the electrode is confined between a current collector and the separator this swelling results in a wrinkly anode. FIG. 32 is a photograph of an example wrinkly anode.

If the anode is left to expand freely, for example in a beaker cell, the material in the anode does not wrinkle, but instead it bulges outward. In this state, it is possible to measure the swelling of the anode layer in the vertical, which in anodes described herein increases from about 33 microns (in the pristine state) to about 45 microns (after full charge).

The approach used to overcome the wrinkling problem can be twofold: the application of pressure to constrain the anode while preventing its lateral expansion, and the use of a blend of polymers to bond anode, cathode and separator together while allowing for movement of the lithium ions. Certain bonding materials are used in some commercially available polymer cells.

In previous attempts, in order to apply pressure onto the cell, the main mechanism used was to sandwich the cell between two sheets of polypropylene, 1/8 of an inch thick, with green felt as interfacial material between them. The stack was held together with paper clips from the sides. This pressure mechanism did not prevent the formation of wrinkles.

In order to apply a higher pressure during the charging step, other setups were tested. Several combinations of materials (polypropylene and aluminum) and interface materials (green felt and rubber) were used to eliminate anode wrinkling during cycling. Table VI summarizes the results.

TABLE VI

| Plate material | Interface material | Pressure method | Wrinkles | Cell number |
|---|---|---|---|---|
| Polypropylene | Rubber | Binder clips | YES | ML4209-4212 |
| Aluminum | Green felt | C-clamps | NO | ML4205-4208 |
| Aluminum | Rubber | C-clamps | NO | ML4221-4224 |
| Aluminum | None | C-clamps | NO | ML4237-4240 |

At high pressures, both green felt and rubber work well. It is important to note that the force applied with the C-clamps is not very well controlled, as it depends on the manual ability of the operator. In case of the cells what were clamped without interfacial material (bare aluminum), the cell stack was very tightly compressed, and the electrodes did not even soak with electrolyte. This result is attributed to excess pressure being applied to the cell stack.

In terms of rate performance, the polymer cells constrained with c-clamps show a better performance than past polymer cells, as summarized in Table VII (values shown are the averages for the four tested cells of each type).

TABLE VII

| Cell type | Cap. @ C/5 (mAh) | Cap. @ C/2 (mAh) | Cap. @ C (mAh) | Cap. @ 2C (mAh) |
|---|---|---|---|---|
| PP/Rubber/ binder clips | 386.7257 | 276.17 | 138.684 | 88.65451 |
| Al/green felt/ c-clamps | 472.9861 | 459.085 | 443.9014 | 397.8245 |
| Al/rubber/ c-clamps | 464.397 | 458.62 | 444.6271 | 387.7365 |

Figure 33A:
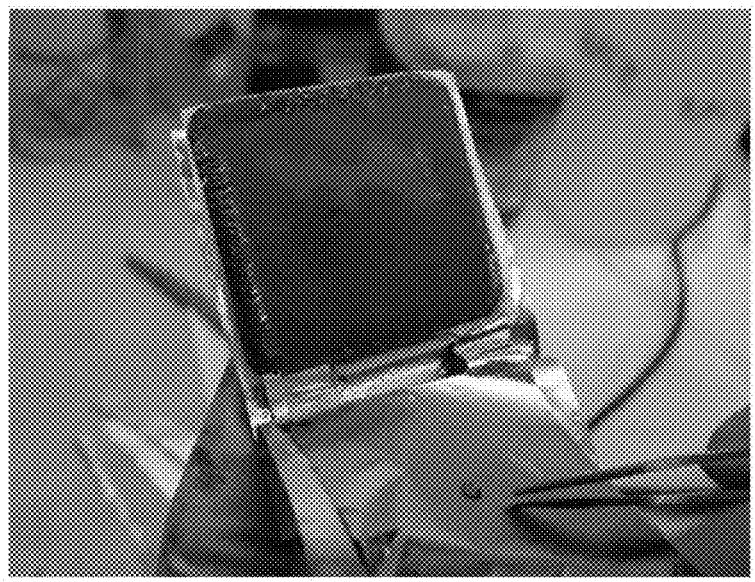
FIG. 33A-C are photographs of anode films where pressure of (A) 100 lb, (B) 75 lb, and (C) 50 lb was applied to the cell.
Figure 33B:
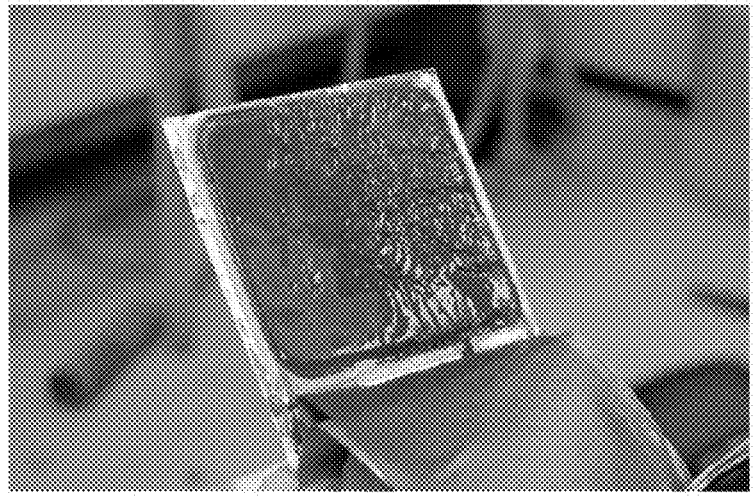
Figure 33C:
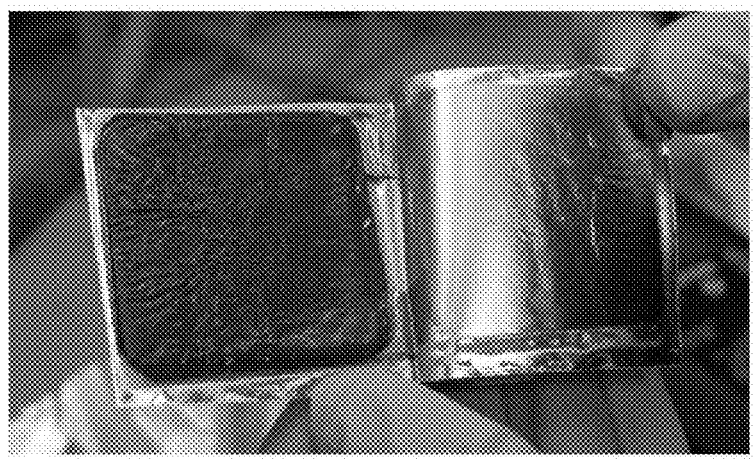

In order to better understand the amount of pressure needed to prevent wrinkling, different weights were applied to 5-layer cells sandwiched between aluminum plates (3×3 inch) with rubber pads (2×2 inch). Four data points were collected, with just one cell for each weight (25, 50, 75 and 100 lb). Of those, only the cell with 100 pounds of force showed complete reduction of the wrinkling problem. FIGS. 33A-C are photographs of anodes for weights 100 lb, 75 lb, and 50 lb, respectively.

Figure 34:
FIG. 34 is a photograph of an anode film which shows the absence of wrinkles.

It is also worth mentioning that applying pressure during forming and then moving the cell into a lower pressure device seems to be an effective way to control wrinkling in the anode. This was done by using the Al/rubber/c-clamp setup during the first charge and discharge, and then transfer the cell stack to a Polypropylene/green felt/binder clips system. FIG. 34 is a photograph of an anode which shows the absence of wrinkles when this procedure is followed.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of forming a composite material, the method comprising:
   providing a mixture comprising a precursor and silicon particles;
   casting the mixture on a surface; and pyrolysing the precursor to convert the precursor into one or more types of carbon phases to form the composite material, wherein pyrolysing the precursor comprises applying pressure to the precursor.

2. The method of claim 1, wherein applying pressure to the precursor comprises applying at least 2 bars of pressure.

3. The method of claim 1, further comprising cycling the composite material.

4. The method of claim 3, wherein the composite material remains substantially flat and substantially free of wrinkles during cycling.

5. The method of claim 1, wherein pyrolysing comprises heating the precursor to about 900° C. to about 1350° C.

6. The method of claim 1, further comprising removing the precursor from the surface prior to pyrolysing the precursor.

7. The method of claim 1, wherein the composite material is self-supported.

8. The method of claim 1, wherein at least one of the one or more types of carbon phases is a substantially continuous phase that holds the composite material together such that the silicon particles are distributed throughout the composite material.

9. The method of claim 8, wherein the at least one of the one or more types of carbon phases that is a substantially continuous phase comprises hard carbon.

10. The method of claim 1, wherein providing the mixture comprises providing the silicon particles at greater than 0% to about 90% by weight.

11. The method of claim 10, wherein the composite material comprises the silicon particles at more than about 50% by weight.

12. The method of claim 11, wherein the composite material comprises the silicon particles at about 60% to about 80% by weight.

13. The method of claim 1, wherein the precursor comprises polyamic acid or polyimide.

14. The method of claim 1, wherein providing the mixture comprises providing conductive particles in the mixture.

15. The method of claim 14, wherein providing the mixture comprises providing metal particles in the mixture.

16. The method of claim 1, wherein providing the mixture comprises providing graphite particles in the mixture.

17. The method of claim 1, wherein the composite material is substantially electrochemically active and electrically conductive.

18. The method of claim 17, wherein the composite material is an anode.

19. The method of claim 1, wherein the casting comprises casting the mixture on the surface of a metal foil.

20. The method of claim 1, wherein the casting comprises casting the mixture on the surface of a copper substrate.

* * * * *